United States Patent
Filippi et al.

(10) Patent No.: US 11,954,127 B1
(45) Date of Patent: *Apr. 9, 2024

(54) DETERMINING AFFINITIES FOR DATA SET SUMMARIZATIONS

(71) Applicant: Splunk Inc., San Francisco, CA (US)

(72) Inventors: Nicholas J. Filippi, San Francisco, CA (US); Siegfried Puchbauer, San Francisco, CA (US); Ruyuan Ge, San Mateo, CA (US)

(73) Assignee: Splunk Inc., San Francisco, CA (US)

( * ) Notice: Subject to any disclaimer, the term of this patent is extended or adjusted under 35 U.S.C. 154(b) by 269 days.

This patent is subject to a terminal disclaimer.

(21) Appl. No.: 17/316,421

(22) Filed: May 10, 2021

Related U.S. Application Data

(63) Continuation of application No. 15/582,453, filed on Apr. 28, 2017, now Pat. No. 11,003,691.

(51) Int. Cl.
*G06F 16/00* (2019.01)
*G06F 16/2458* (2019.01)
*G06F 16/28* (2019.01)

(52) U.S. Cl.
CPC ........ *G06F 16/283* (2019.01); *G06F 16/2465* (2019.01)

(58) Field of Classification Search
CPC ........................... G06F 16/283; G06F 16/2465
See application file for complete search history.

(56) References Cited

U.S. PATENT DOCUMENTS

| | | |
|---|---|---|
| 5,696,964 A | 12/1997 | Cox et al. |
| 6,434,550 B1 | 8/2002 | Warner et al. |
| 6,665,841 B1 | 12/2003 | Mahoney et al. |
| 7,017,114 B2 | 3/2006 | Guo et al. |
| 7,890,519 B2 | 2/2011 | Dettinger et al. |
| 7,937,344 B2 | 5/2011 | Baum et al. |
| 8,112,425 B2 | 2/2012 | Baum et al. |
| 8,150,822 B2 | 4/2012 | Bluvband |
| 8,751,529 B2 | 6/2014 | Zhang et al. |
| 8,788,525 B2 | 7/2014 | Neels et al. |
| 9,215,240 B2 | 12/2015 | Merza et al. |

(Continued)

OTHER PUBLICATIONS

Lex, Alexander, et al. "UpSet: visualization of intersecting sets." IEEE transactions on visualization and computer graphics 20.12 (2014): 1983-1992.*

(Continued)

*Primary Examiner* — Nan Hutton

(74) *Attorney, Agent, or Firm* — Knobbe, Martens, Olson & Bear, LLP

(57) ABSTRACT

Systems and methods are disclosed for associating summarizations of visualizations of a data set based on affinities between the summarizations. For a data set, a number of summarizations may be created that summarizes the data set in different ways. The summarizations may be linked, such that selecting a data element of a first summarization causes display of a second summarization. To assist in linking of summarizations, suggested linkings between summarizations can be determined based on affinities of the two summarizations. Affinities can reflect similarities in the data content of the two summarizations, such as an output of a first summarization being a valid input to the second summarization.

20 Claims, 25 Drawing Sheets

(56) References Cited

U.S. PATENT DOCUMENTS

| | | | |
|---|---|---|---|
| 9,286,413 B1 | 3/2016 | Coates et al. | |
| 9,335,911 B1 | 5/2016 | Elliot et al. | |
| 10,127,258 B2 | 11/2018 | Lamas et al. | |
| 10,318,567 B2* | 6/2019 | Henry | G06F 16/248 |
| 11,003,691 B2 | 5/2021 | Filippi et al. | |
| 11,074,283 B2 | 7/2021 | Filippi et al. | |
| 2002/0052901 A1 | 5/2002 | Guo et al. | |
| 2002/0118226 A1 | 8/2002 | Hough et al. | |
| 2004/0059746 A1 | 3/2004 | Error et al. | |
| 2005/0267865 A1 | 12/2005 | Bird et al. | |
| 2006/0136504 A1 | 6/2006 | Babutzka et al. | |
| 2008/0163164 A1 | 7/2008 | Chowdhary et al. | |
| 2008/0168056 A1 | 7/2008 | Bluvband et al. | |
| 2009/0031244 A1 | 1/2009 | Brezina et al. | |
| 2009/0240672 A1 | 9/2009 | Costello | |
| 2009/0282006 A1 | 11/2009 | Misvaer et al. | |
| 2012/0005584 A1 | 1/2012 | Seago et al. | |
| 2014/0081903 A1 | 3/2014 | Koosel et al. | |
| 2014/0214888 A1 | 7/2014 | Marquardt et al. | |
| 2014/0324862 A1 | 10/2014 | Bingham et al. | |
| 2015/0149879 A1 | 5/2015 | Miller et al. | |
| 2015/0024256 A1 | 8/2015 | Cannon et al. | |
| 2015/0369893 A1 | 12/2015 | Takeshima | |
| 2016/0055225 A1 | 2/2016 | Xu et al. | |
| 2016/0105338 A1 | 4/2016 | Fletcher et al. | |
| 2017/0140101 A1 | 5/2017 | Anderson et al. | |
| 2018/0096027 A1 | 4/2018 | Romero et al. | |
| 2019/0098106 A1 | 3/2019 | Mungel et al. | |
| 2020/0233925 A1* | 7/2020 | Reyes Ramirez | A61B 5/167 |

OTHER PUBLICATIONS

Dou, Wenwen, et al. "Leadline: Interactive visual analysis of text data through event identification and exploration." 2012 IEEE Conference on Visual Analytics Science and Technology (VAST). IEEE, 2012.*

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Carraso, David, "Exploring Splunk," published by CITO Research, New York, NY, Apr. 2012.

SLAML 10 Reports, Workshop On Managing Systems via Log Analysis and Machine Learning Techniques, ;login: Feb. 2011 Conference Reports.

Splunk Enterprise 8.0.0 Overview, available online, retrieved May 20, 2020 from docs.splunk.com.

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Castano, et al.: "Global Viewing of Heterogeneous Data Sources," IEEE Transactions on Knowledge and Data Engineering 13.2 (2001): 277-297.

Sarka, et al.: "Sentence Clustering-based Summarization of Multiple Text Documents," TECHNIA—International Journal of Computing Science and Communication Technologies 2.1 (2009): 325-335.

* cited by examiner

FIG. 6A

Data Summary

| Hosts (5) | Sources (8) | Sourcetypes (3) | | ✕ | filter

| Host ◊ | Count ◊ | Last Update ◊ |
|---|---|---|
| mailsv | 9,829 | 4/29/14 1:32:47.000 PM |
| vendor_sales | 30,244 | 4/29/14 1:32:46.000 PM |
| www1 | 24,221 | 4/29/14 1:32:44.000 PM |
| www2 | 22,595 | 4/29/14 1:32:47.000 PM |
| www3 | 22,975 | 4/29/14 1:32:45.000 PM |

Original Search:
Search "error" | stats count BY host ← 802

Sent to peers:
Search "error" | prestats count BY host ← 804

Executed by search head:
Aggregate the prestats results received from peers ← 806

USER VIEW DASHBOARD 1220

MY SITE
EDIT ⟵ 1226

SELECT USER: [userID84 ▼] ⟵ 1222

| TOTAL VIEWS | VIEWS TODAY | ERRORS | MOST COMMON ERROR |
| --- | --- | --- | --- |
| 48 ↗ +10 | 2 ↘ -1 | 1 | 503 |

⎫ 1224

VIEW DETAILS

| _time | page.id | error | response.timeMS |
| --- | --- | --- | --- |
| 2017-01-04 14:11:50 | page33 | none | 41 |
| 2017-01-04 12:22:43 | page33 | none | 20 |
| 2017-01-03 11:43:59 | page99 | 503 | 850 |
| 2017-01-02 09:00:34 | page27 | none | 251 |
| 2017-01-01 20:11:12 | page31 | none | 20 |
| 2017-01-01 16:01:35 | page1 | none | 50 |

DETERMINING AFFINITIES FOR DATA SET SUMMARIZATIONS

FIELD

At least one embodiment of the present disclosure pertains to one or more tools for facilitating searching and analyzing large sets of data to locate data of interest.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include performance data, diagnostic data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it.

Although the availability of vastly greater amounts of diverse data on diverse data systems provides opportunities to derive new insights, it also gives rise to technical challenges to search and analyze the data. Tools exist that allow an analyst to search data systems separately and collect results over a network for the analyst to derive insights in a piecemeal manner. However, UI tools that allow analysts to quickly search and analyze large set of raw machine data to visually identify data subsets of interest, particularly via straightforward and easy-to-understand sets of tools and search functionality do not exist.

BRIEF DESCRIPTION OF THE DRAWINGS

In the drawings:

FIG. 6A illustrates a search screen in accordance with the disclosed embodiments;

FIG. 6B illustrates a data summary dialog that enables a user to select various data sources in accordance with the disclosed embodiments;

FIGS. 7A-7D illustrate a series of user interface screens for an example data model-driven report generation interface in accordance with the disclosed embodiments;

FIGS. 12A-12C illustrate a series of user interface screens for correlating summarizations of a data set using affinities between data related to the summarizations;

DETAILED DESCRIPTION

Figure 1:
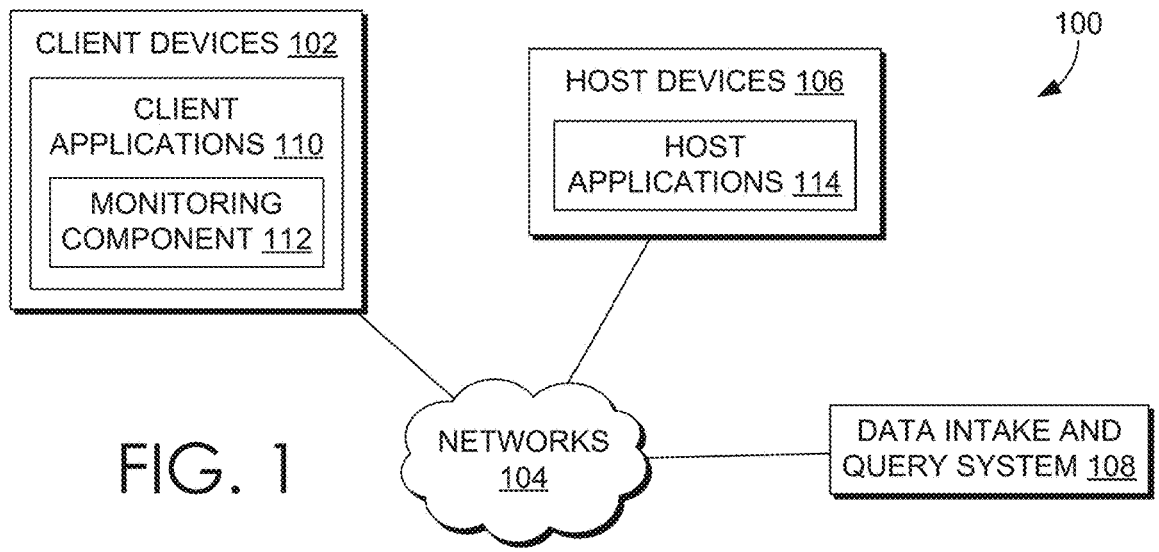
FIG. 1 illustrates a networked computer environment in which an embodiment may be implemented.

Embodiments are described herein according to the following outline:
1.0. General Overview
2.0. Operating Environment
   2.1. Host Devices
   2.2. Client Devices
   2.3. Client Device Applications
   2.4. Data Server System
   2.5. Data Ingestion
      2.5.1. Input
      2.5.2. Parsing
      2.5.3. Indexing
   2.6. Query Processing
   2.7. Field Extraction
   2.8. Example Search Screen
   2.9. Data Modelling
   2.10. Acceleration Techniques
      2.10.1. Aggregation Technique
      2.10.2. Keyword Index
      2.10.3. High Performance Analytics Store
      2.10.4. Accelerating Report Generation
   2.11. Security Features
   2.12. Data Center Monitoring
   2.13. Cloud-Based System Overview
   2.14. Searching Externally Archived Data
   2.14.1. ERP Process Features
3.0 Correlating Summarizations Using Data Affinities
   3.1 User Interface
   3.2 Summarization Attributes
   3.3 Determining Affinities

1.0. GENERAL OVERVIEW

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. OPERATING ENVIRONMENT

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104.

Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML, documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
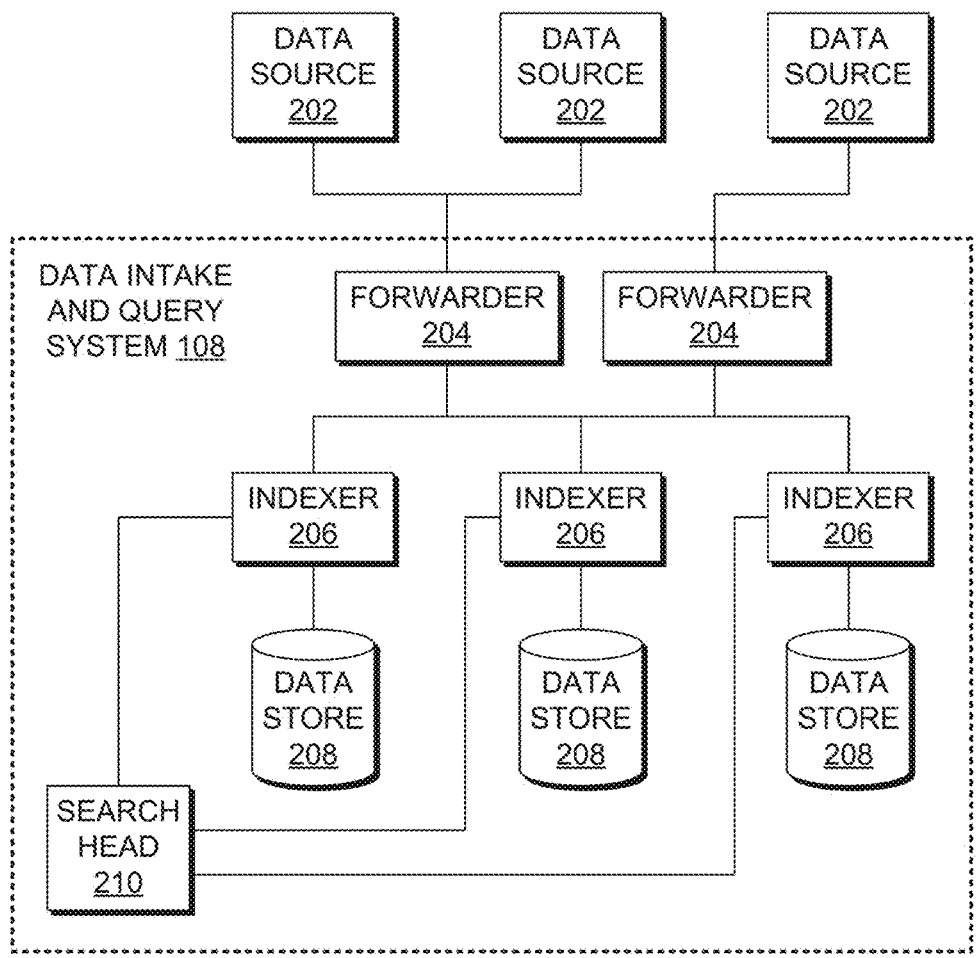
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
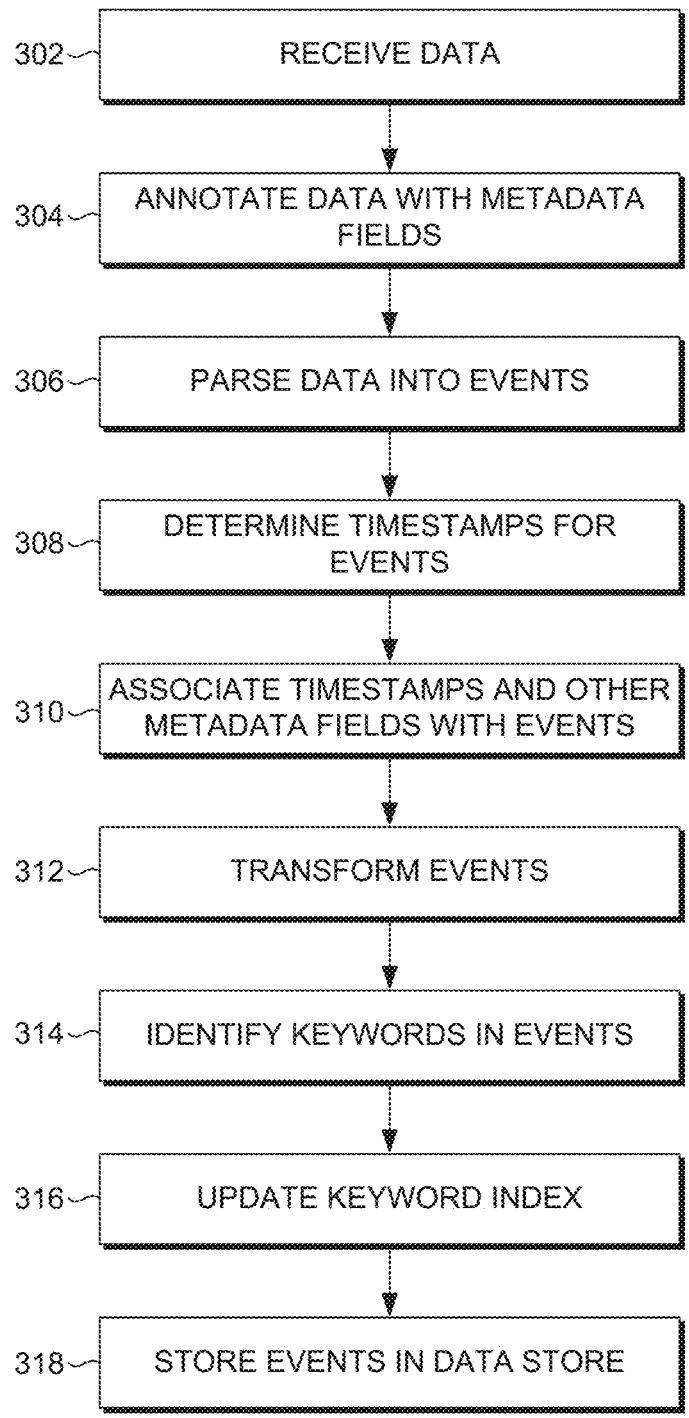
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S.

patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
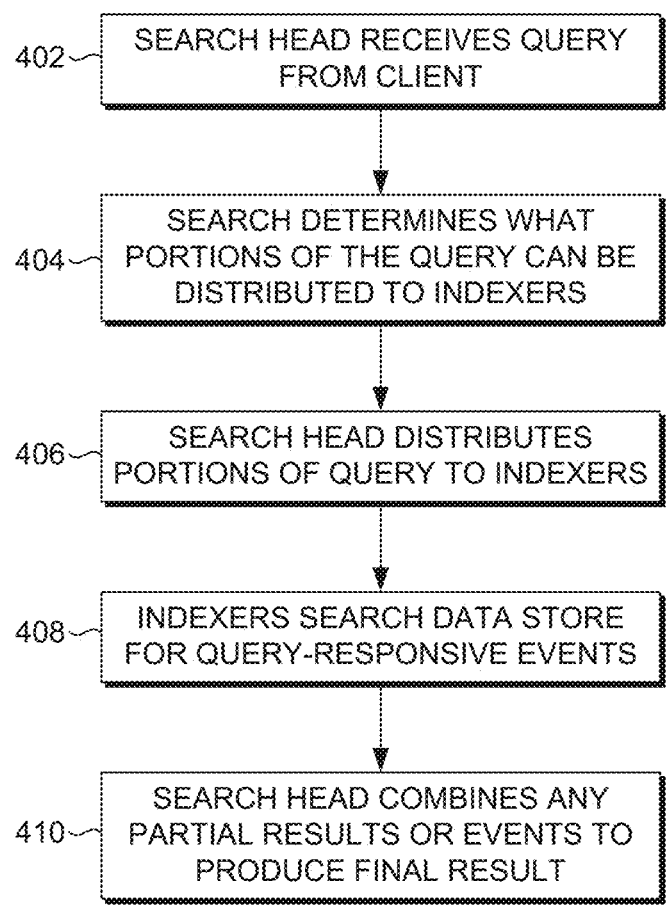
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
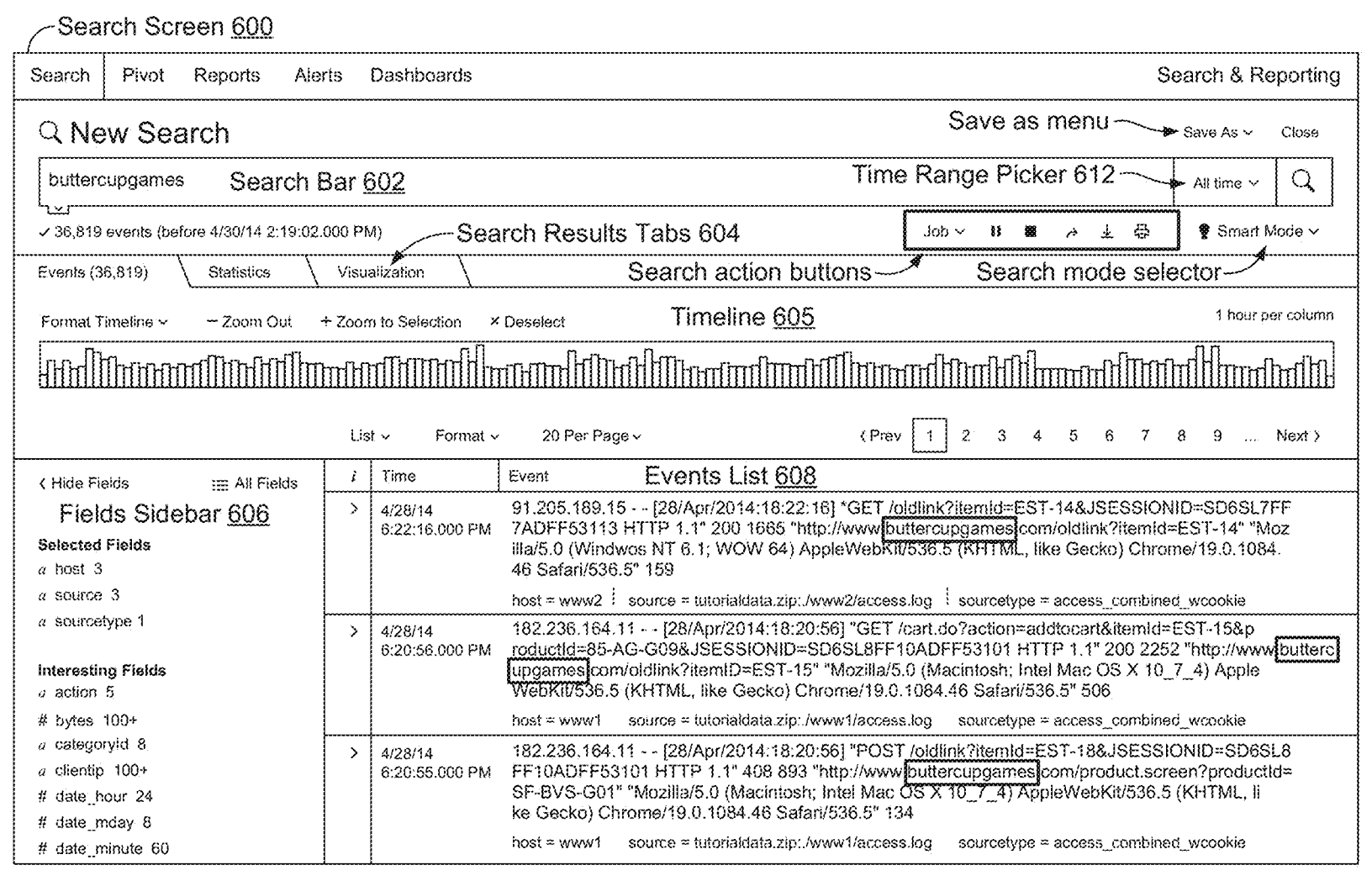

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (August 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 12, 13, and 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

The selection of a data model object for use in driving a report generation may be facilitated by a data model object selection interface. Once a data model object is selected by the user, a user interface screen 700 shown in FIG. 7A may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7A:
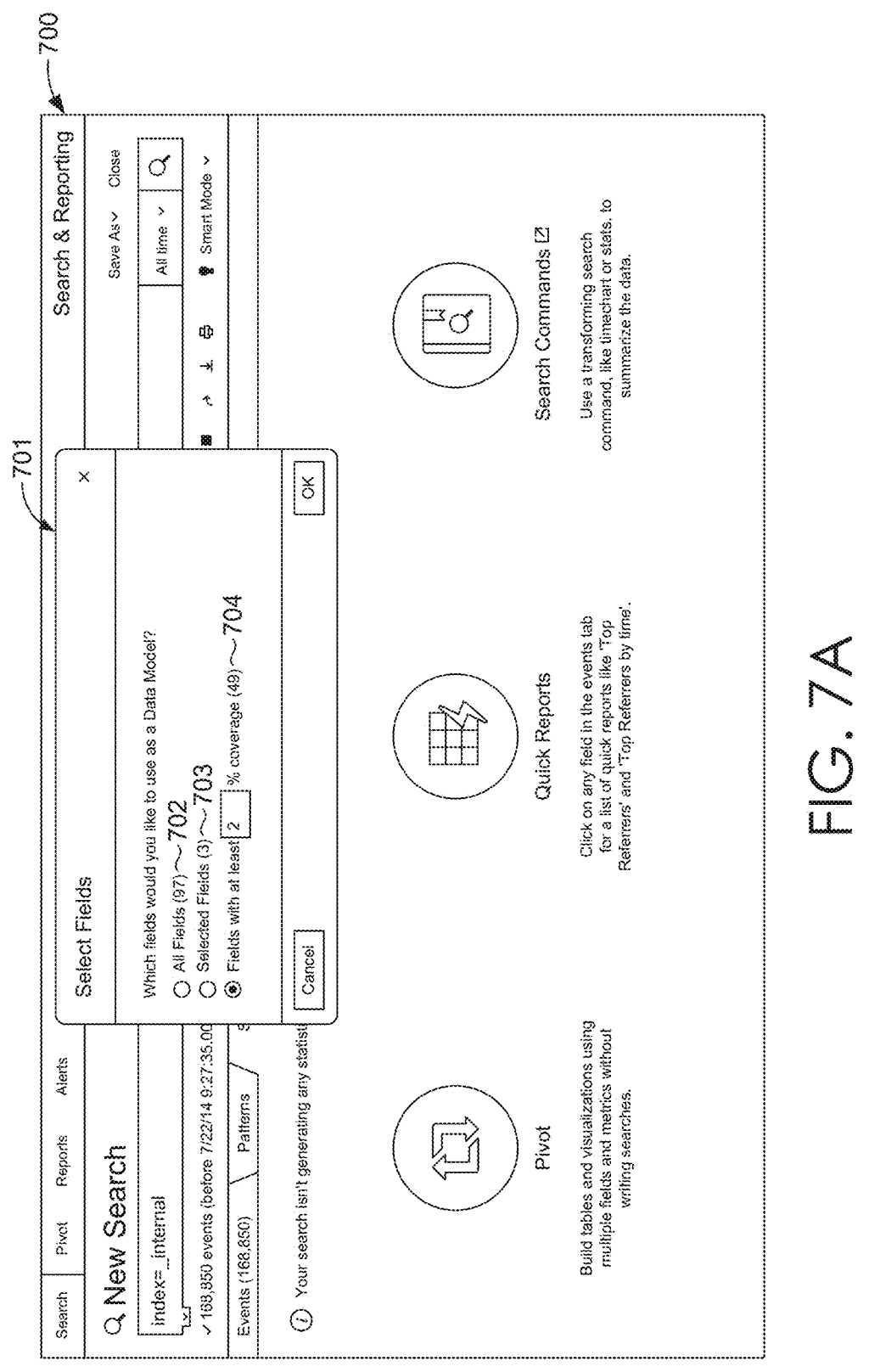
Figure 7B:
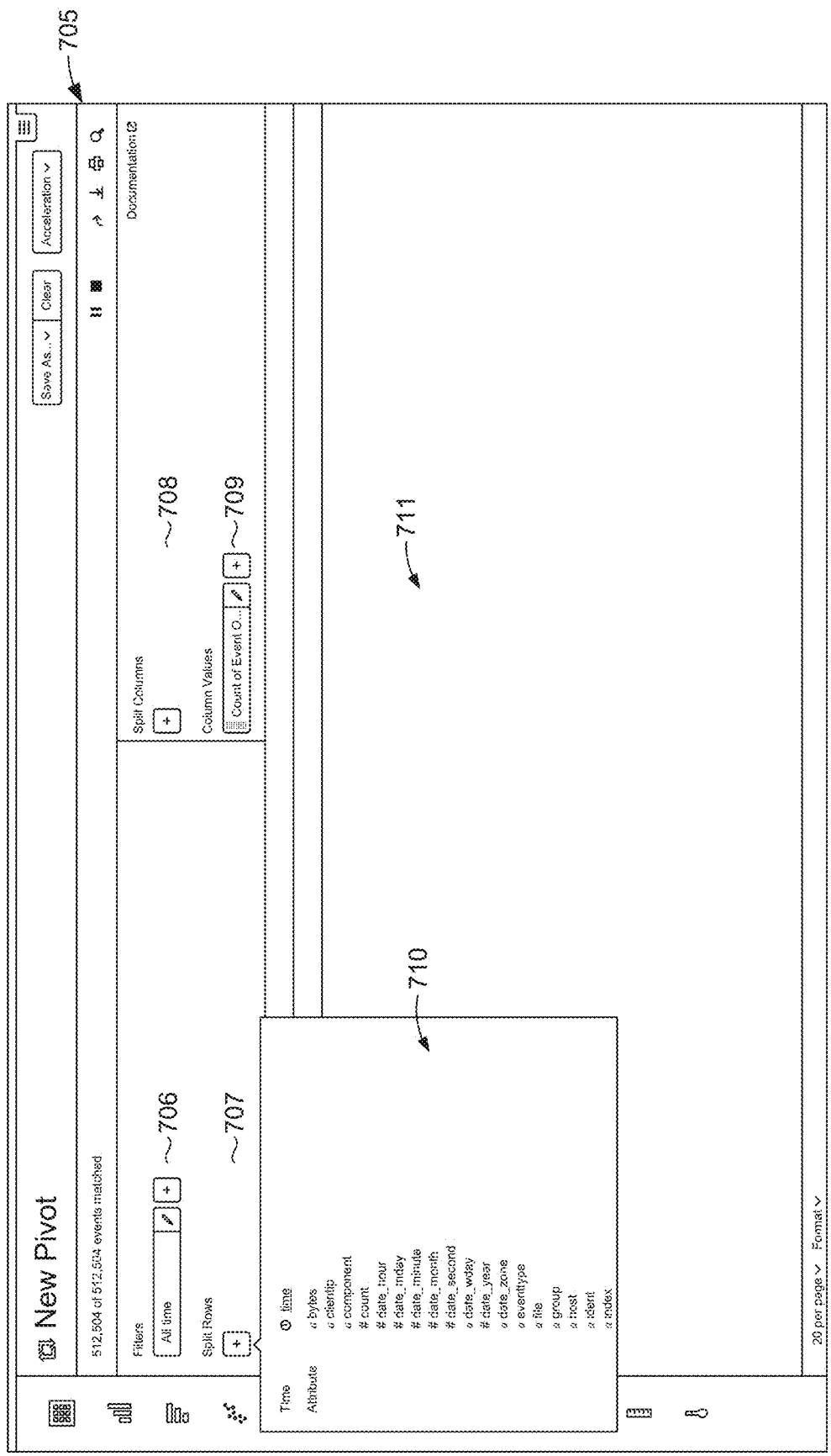
Figure 7C:
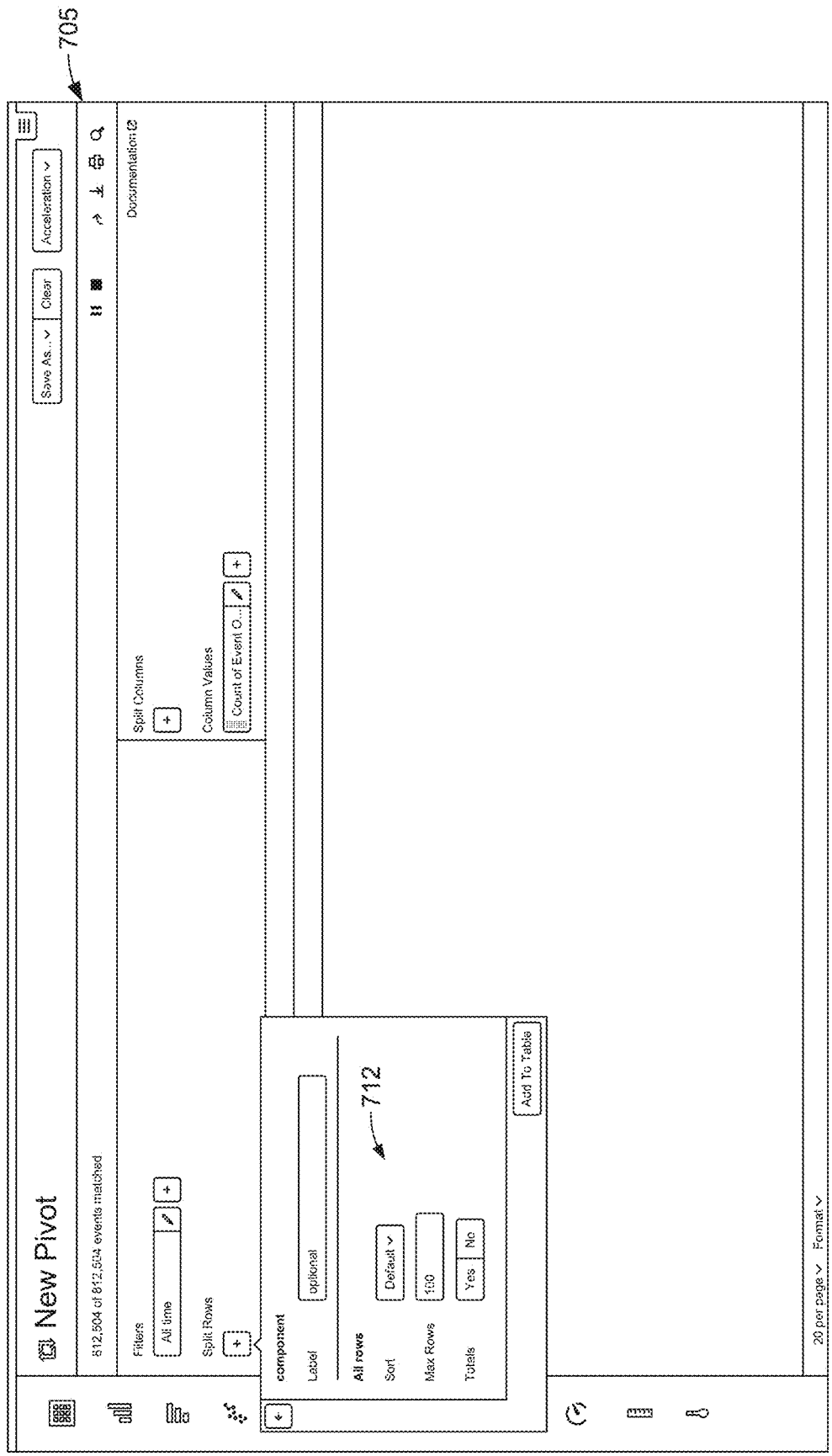

FIG. 7B illustrates an example graphical user interface screen (also called the pivot interface) 705 displaying the reporting application's "Report Editor" page. The screen may display interactive elements for defining various elements of a report. For example, the page includes a "Filters" element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user. FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
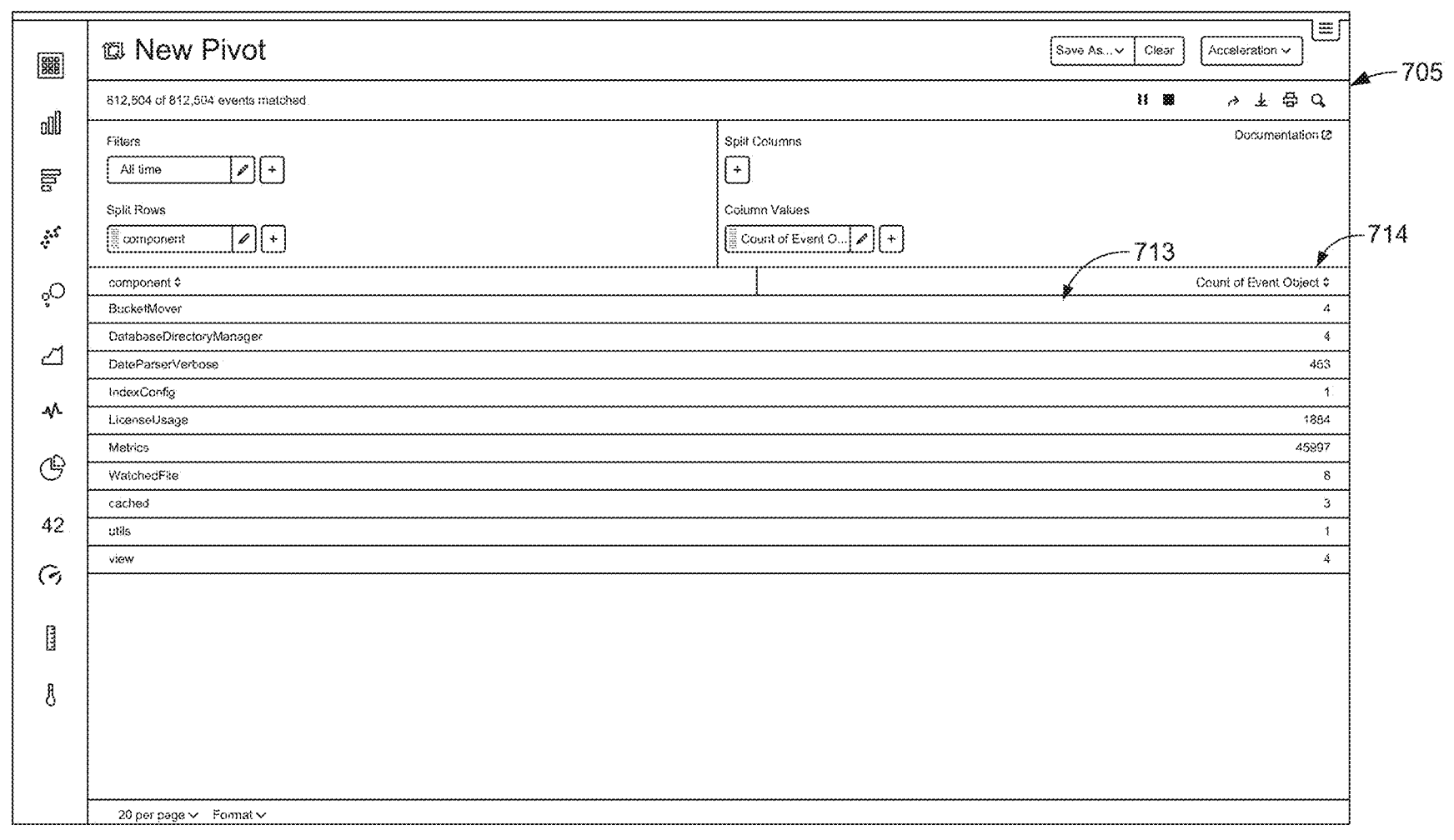

FIG. 7D illustrates an example graphical user interface screen 705 including a table of results 713 based on the selected criteria including splitting the rows by the "component" field. A column 714 having an associated count for each component listed in the table may be displayed that indicates an aggregate count of the number of times that the particular field-value pair (e.g., the value in a row) occurs in the set of events responsive to the initial search query.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 8:
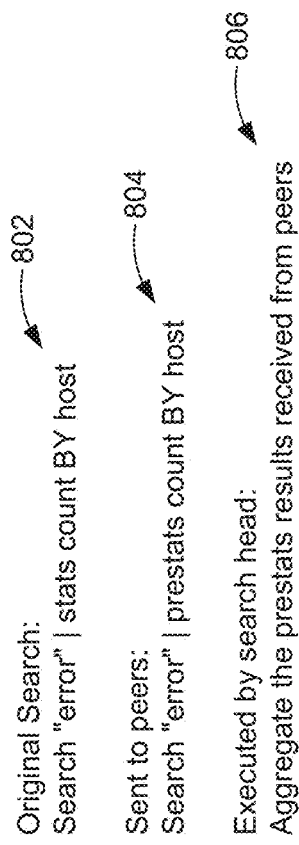
FIG. 8 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
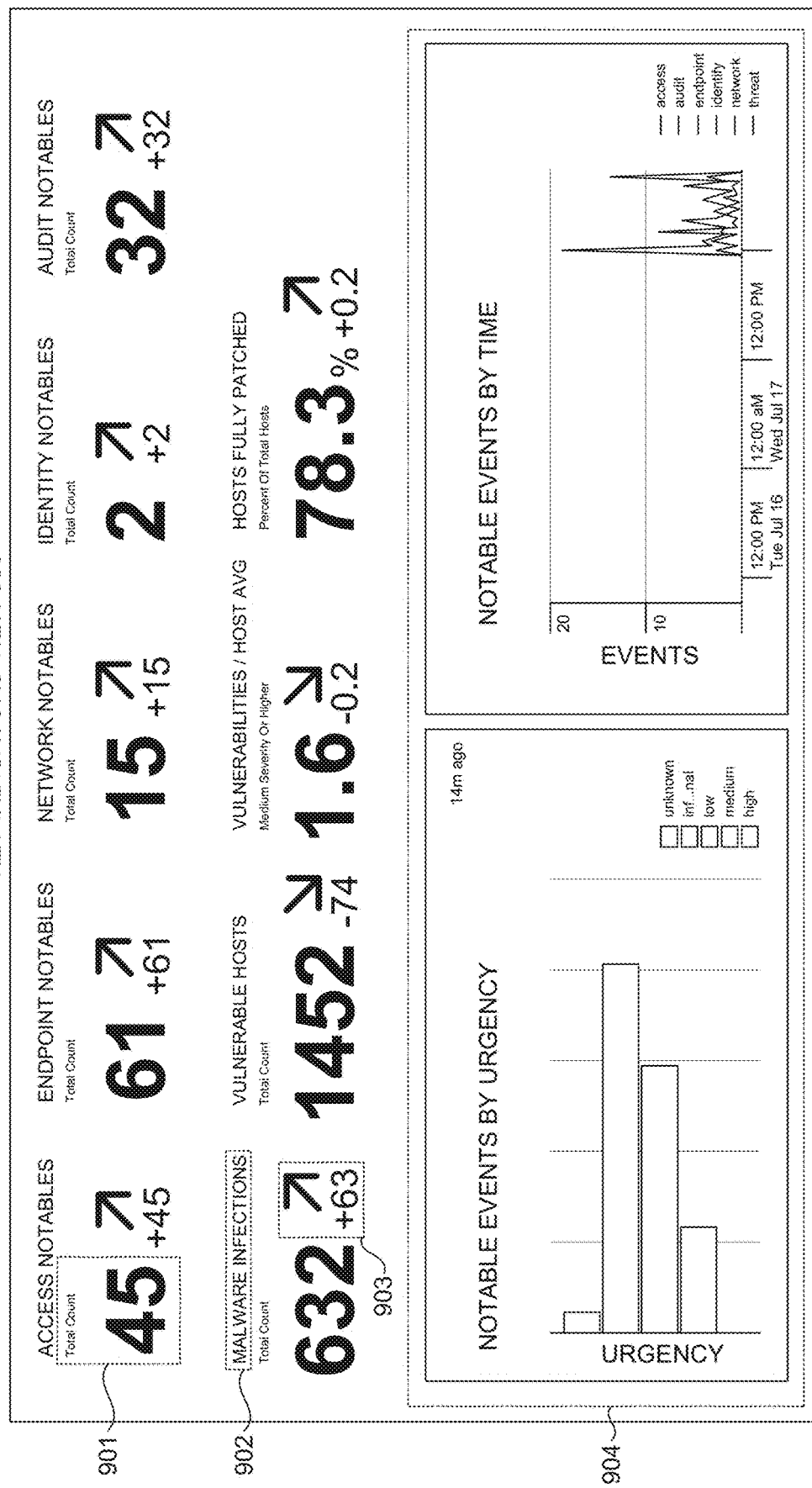
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 9B:
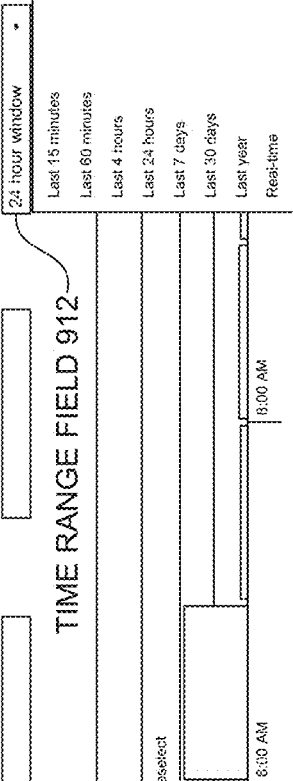
FIG. 9B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developers' task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPO- NENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

Figure 9C:
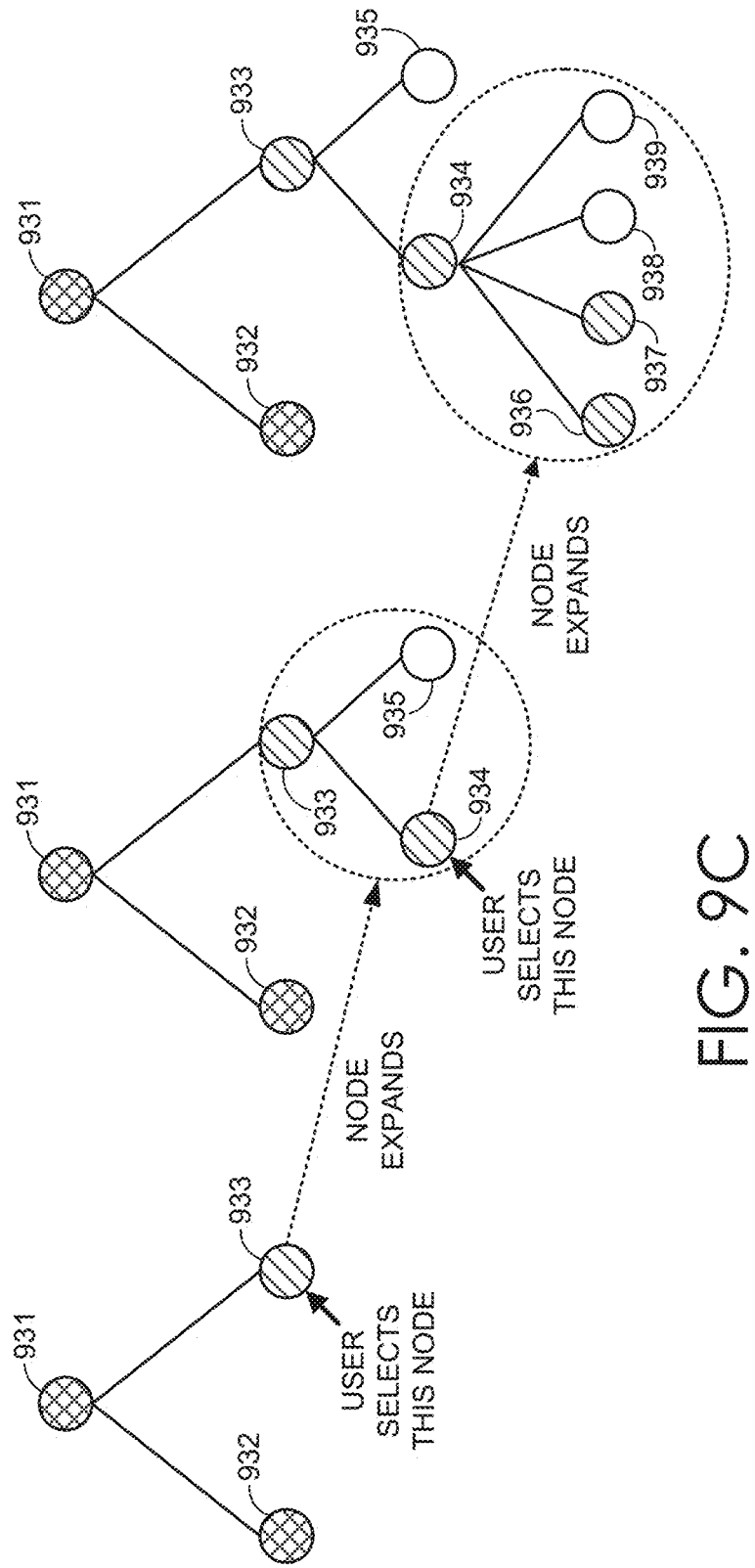
FIG. 9C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 9D:
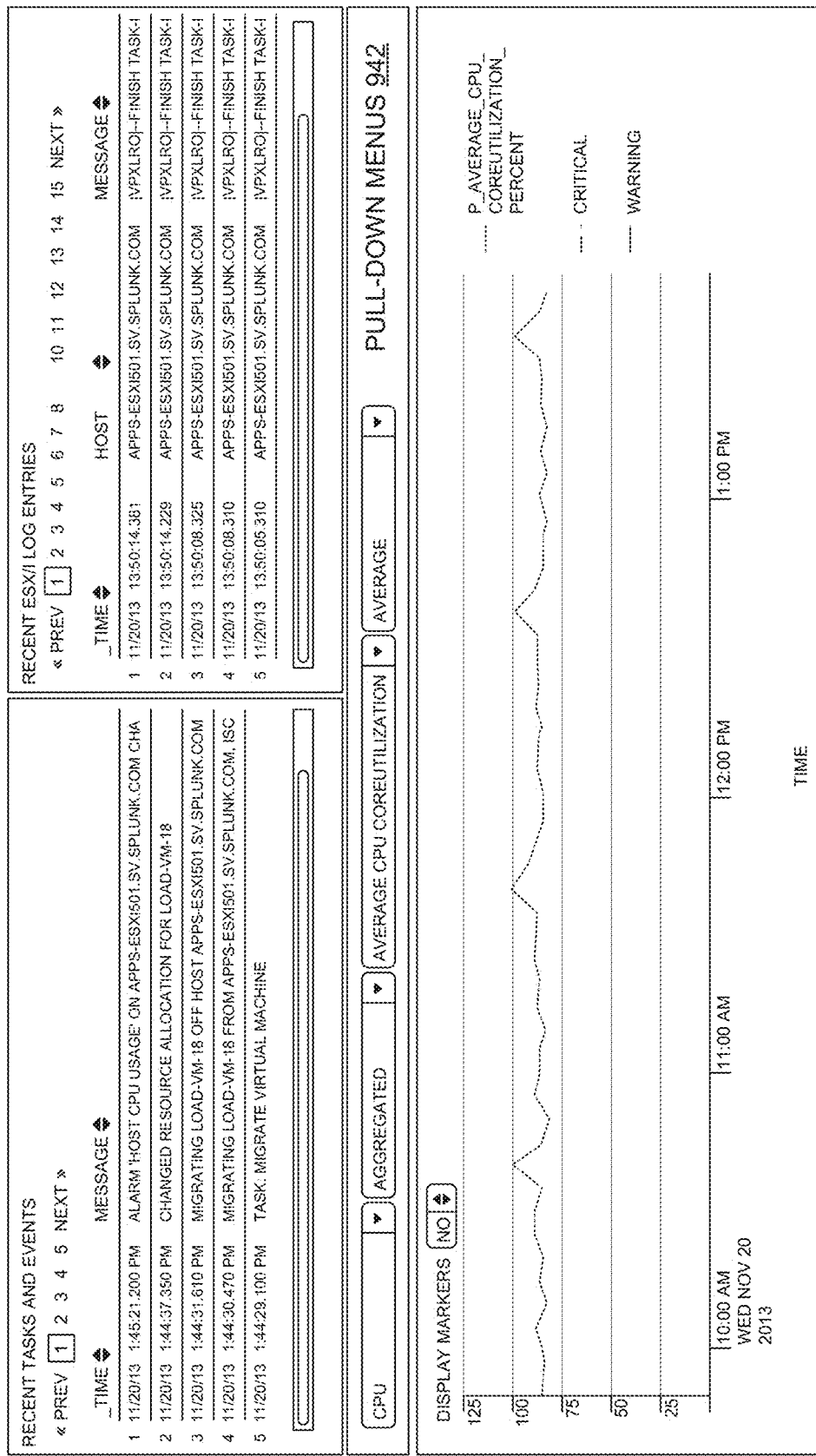
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 10:
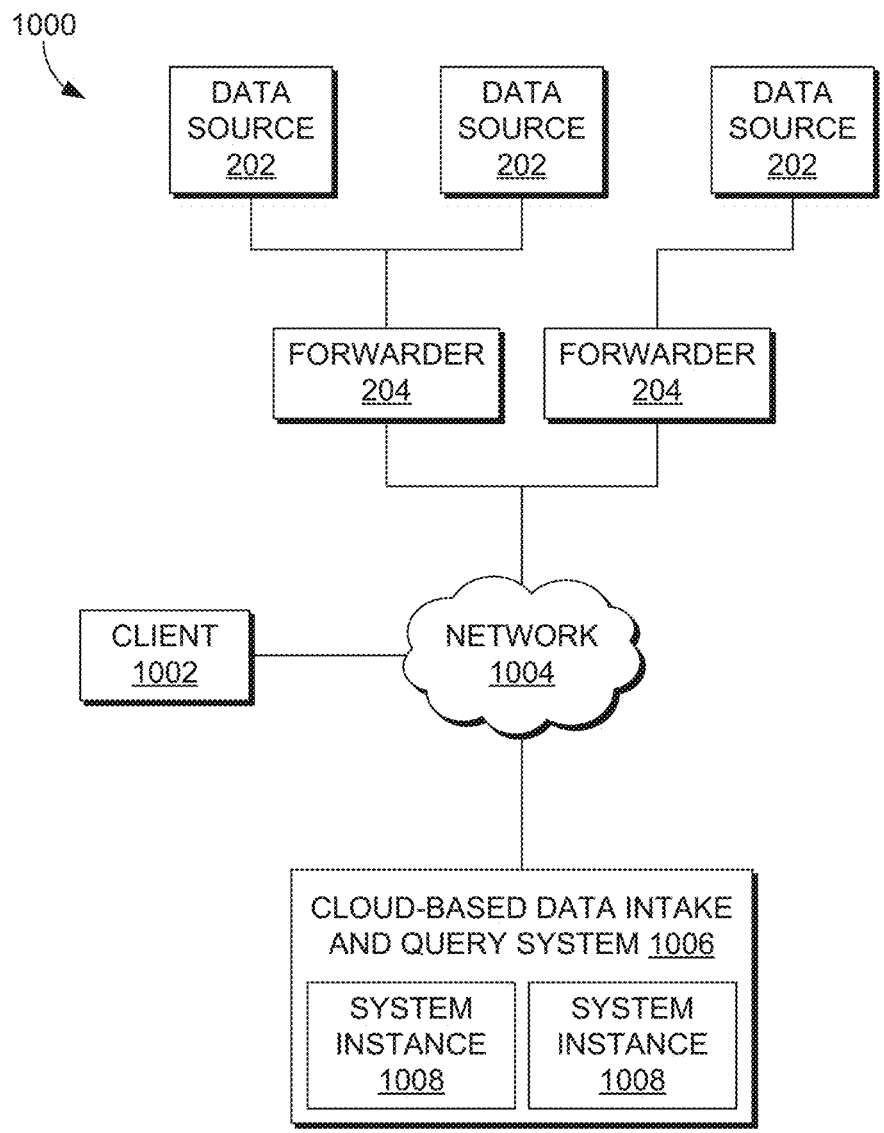
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14. Searching Externally Archived Data

Figure 11:
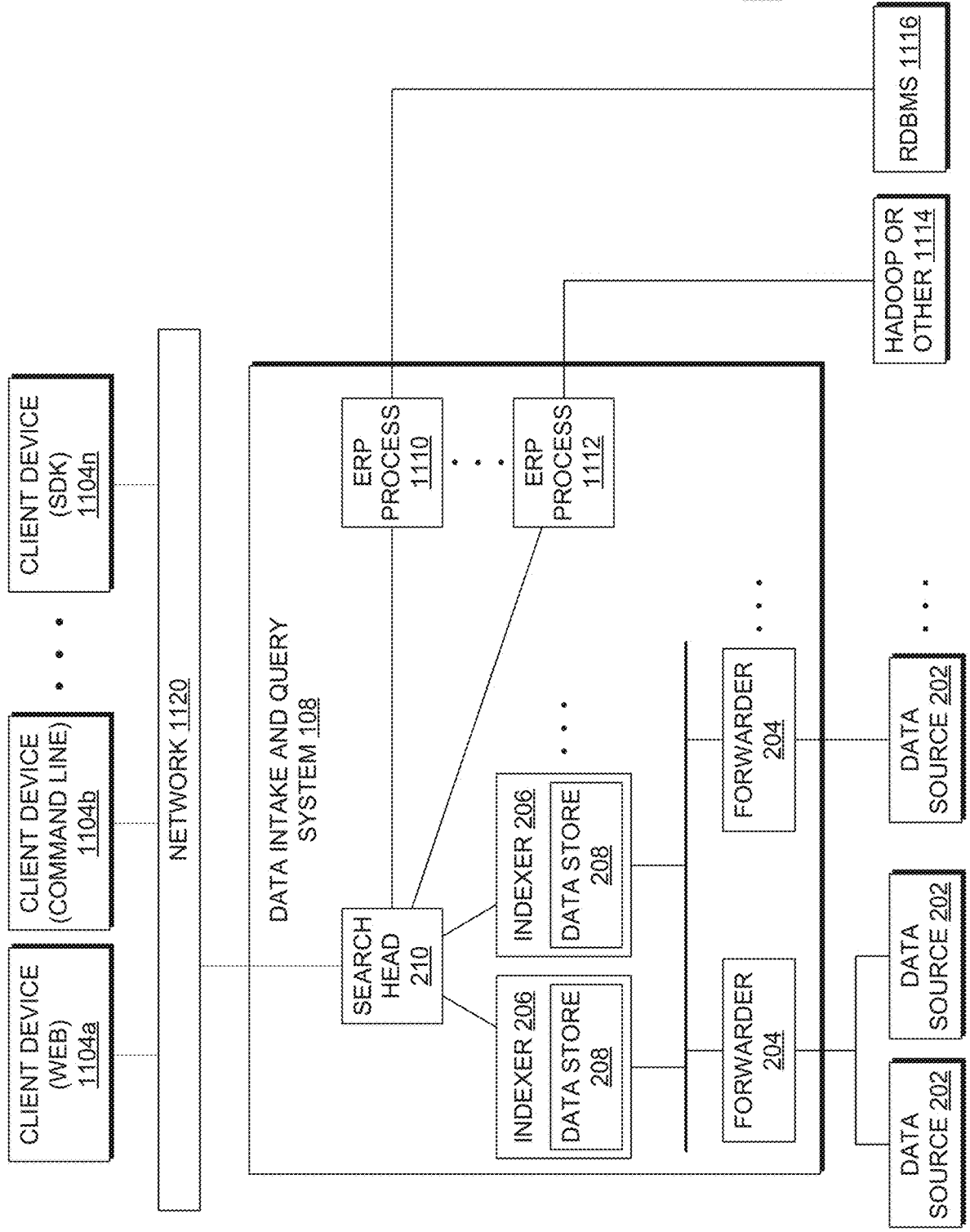
FIG. 11 illustrates a block diagram of an example data intake and query system that performs searches across external data systems in accordance with the disclosed embodiments.

FIG. 11 shows a block diagram of an example of a data intake and query system 108 that provides transparent search facilities for data systems that are external to the data intake and query system. Such facilities are available in the HUNK® system provided by Splunk Inc. of San Francisco, California. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104a, 1104b, . . . , 1104n may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112. FIG. 11 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the ]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.14. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, California.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.0 Correlating Summarizations Using Data Affinities

As noted above, the present disclosure enables large data sets to be queried, and for visualizations or other representations of query results to be created that provide a summary of various aspects of the data sets to an end user. These visualizations or other representations of query results are generally referred to herein as "summarizations," and may include any textual or graphical representation summarizing an aspect of underlying data (such as raw machine data). These summarizations may include, by way of non-limiting example, a single visualization (such as a chart, graph, report, or listing of search results) or a collection of visualizations displayed in relation to one another (such as a "dashboard"). Summarizations may be helpful to enable an end user to quickly comprehend important aspects of a data set, without being required to manually review the entire data set. For example, summarizations may enable an administrator to quickly identify errors within a computing system that would otherwise be "buried" within logs of the system.

In many instances, it is beneficial not only to provide summarizations of a data set, but also to enable interactions with those summarizations to provide an intuitive interface for navigating various aspects of the data set. For example, it may be beneficial to enable an administrator or other end user to select an individual data element within a visualization, such as a total number of errors identified in log files, and to view further details regarding those log files. To enable this functionality, one possibility is for a human to subjectively identify relationships between various summarizations, and to modify a first summarization to link it to a second summarization. However, as the amount of data in a data set grows, and as the various ways to summarize that data grows, it becomes difficult for a human user to accurately identify relationships between various visualizations. Thus, it is beneficial to enable a computing device to identify potential relationships between summarizations, and to suggest such relationships to a user such that a link can be created between the summarizations. It is further beneficial to provide an intuitive interface (e.g., a graphical user interface, or "GUI") through which such suggestions can be provided, and which further enables a user to generate a link between the summarizations. This link may then be used, for example, to navigate from one summarization to a related summarization by interactions with the data elements of the summarizations.

As an illustrative example, relationships between summarizations (also referred to herein as "correlations" between summarizations) can enable "drill down" functionality within a summarization. Generally described, drill down functionality can enable selection of a data element within a first summarization to cause display of a second summarization, which provides more information with respect to the selected data element, or which otherwise provides a different view of a data set with respect to a selected data element. For example, assume a first summarization is an overview of operations on a computer network, which depicts limited information regarding individual users of the computer network. A drill down on such a summarization may include making individual users selectable to provide a second summarization that depicts further details regarding the selected user. In one embodiment, the second summarization may take as an input the selected user (or data associated with the second user) and utilize that input in generating the second summarization.

As noted above, it is possible to "hard code" relationships between summarizations, such as by enabling a user to specify what second summarization to be shown in response to selection of a data element in a first summarization. However, human specification of relationships may be difficult and non-intuitive in instances where many potential additional summarizations of a data set exist. Thus, the present disclosure enables automated identification of relationships between summarizations based on a comparison of the attributes of those summarizations. These attributes include, but are not limited to, grouping criteria for summarizations (e.g., that determine how data of the summarization is partitioned or grouped), the data elements represented in summarizations (e.g., the outputs of the summarizations), queries against a data set used to generate the summarizations (including attributes or parameters of the query), data derivable from outputs of the summarizations (e.g., data corresponding to the outputs), a name of the summarization, a creation or modification time of the summarization, or a popularity of the summarization.

By comparing attributes between two summarizations, a computing device may identify affinities between the summarizations, indicating how relevant a first summarization likely is to a second summarization. For example, where a first summarization depicts general information about errors recorded in a computer network, and a second summarization depicts a detailed report of an individual error on the computer network, a high affinity may exist between the first and second summarizations. Conversely, where a first summarization depicts general information about errors recorded in a computer network and a second summarization depicts unrelated information (even if that information is contained within the same data set), a low affinity likely exists between the first and second summarizations.

In one embodiment, affinities between summarizations can be determined based on a weighted combination of various factors, such as a compatibility between an output of a first summarization and an input to a second summarization, a similarity in queries corresponding to the summarizations, etc. Determined affinities may then be used to generate, with respect to a first summarization, an ordered list or ranking of additional summarizations potentially related to the first summarization. In one embodiment, this ordered list may be presented to a user via an interface to modify functionality of the first summarization, such as by enabling a user to interact with the first summarization to reach the second summarization. Thus, a computing system can provide an intuitive interface through which affinities between summarizations are viewable to an end user.

As will be appreciated by one of skill in the art in light of the present disclosure, the embodiments disclosed herein improves the ability of computing systems, such as a SPLUNK® ENTERPRISE system, to achieve functionality not previously possible on a computing device, and that instead required subjective, manual input by a human. Specifically, aspects of the present disclosure enable the automated identification of relationships or correlations between summarizations of a data set, based on a comparison of attributes of those summarizations. The presently disclosed embodiments address technical problems inherent within computing systems; specifically, the difficulty in determining relationships between large data sets and the dependence of such computing systems on subjective analysis of humans. These technical problems are addressed by the various technical solutions described herein, including the comparison of attributes of different summarizations of a data set to identify affinities between the summarizations, and the depiction of a listing of potential relationships between summarizations ordered based on those affinities. Thus, the present disclosure represents an improvement on existing data processing systems and computing systems in general.

3.1 User Interface

Figure 12A:
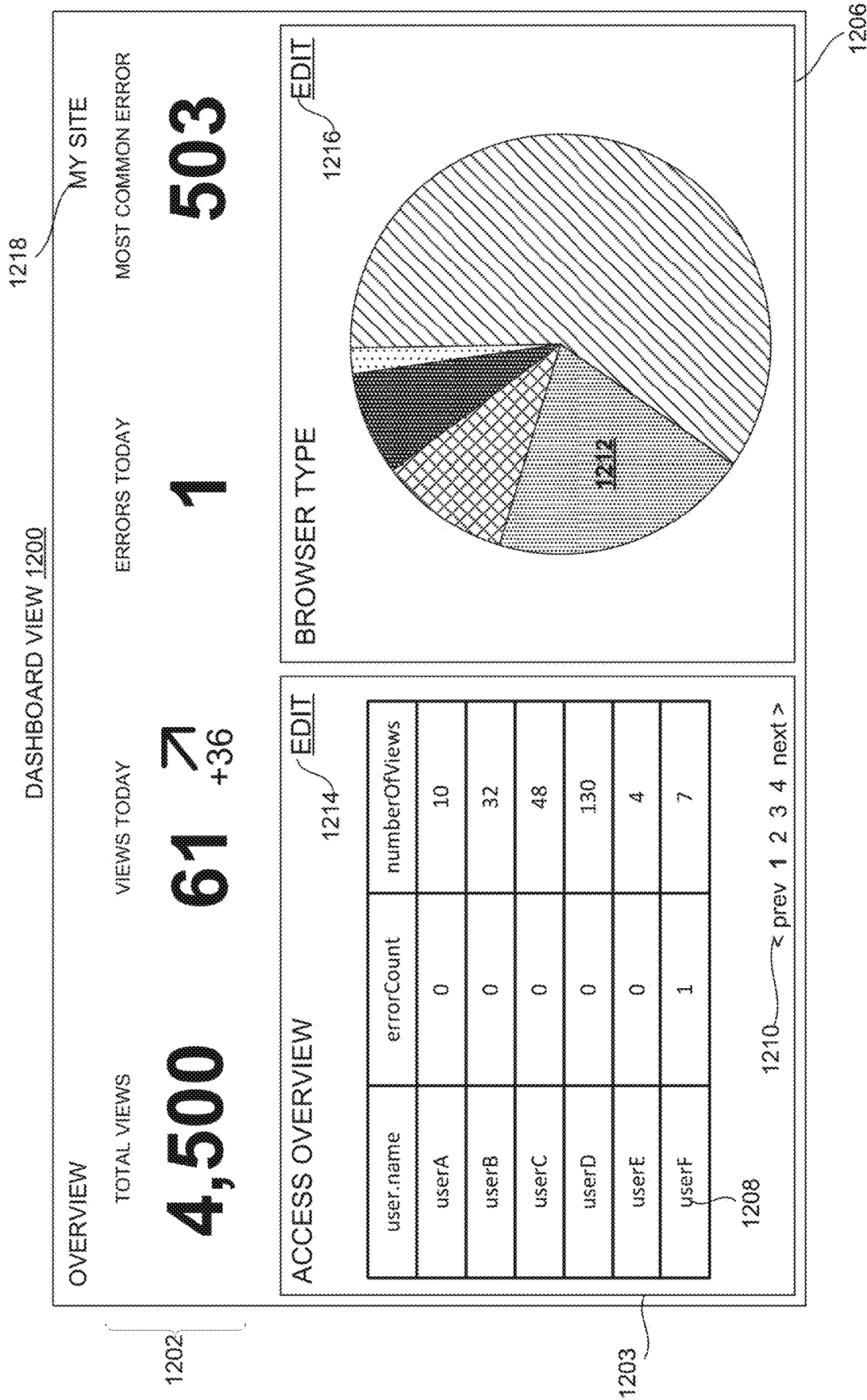
Figure 12C:
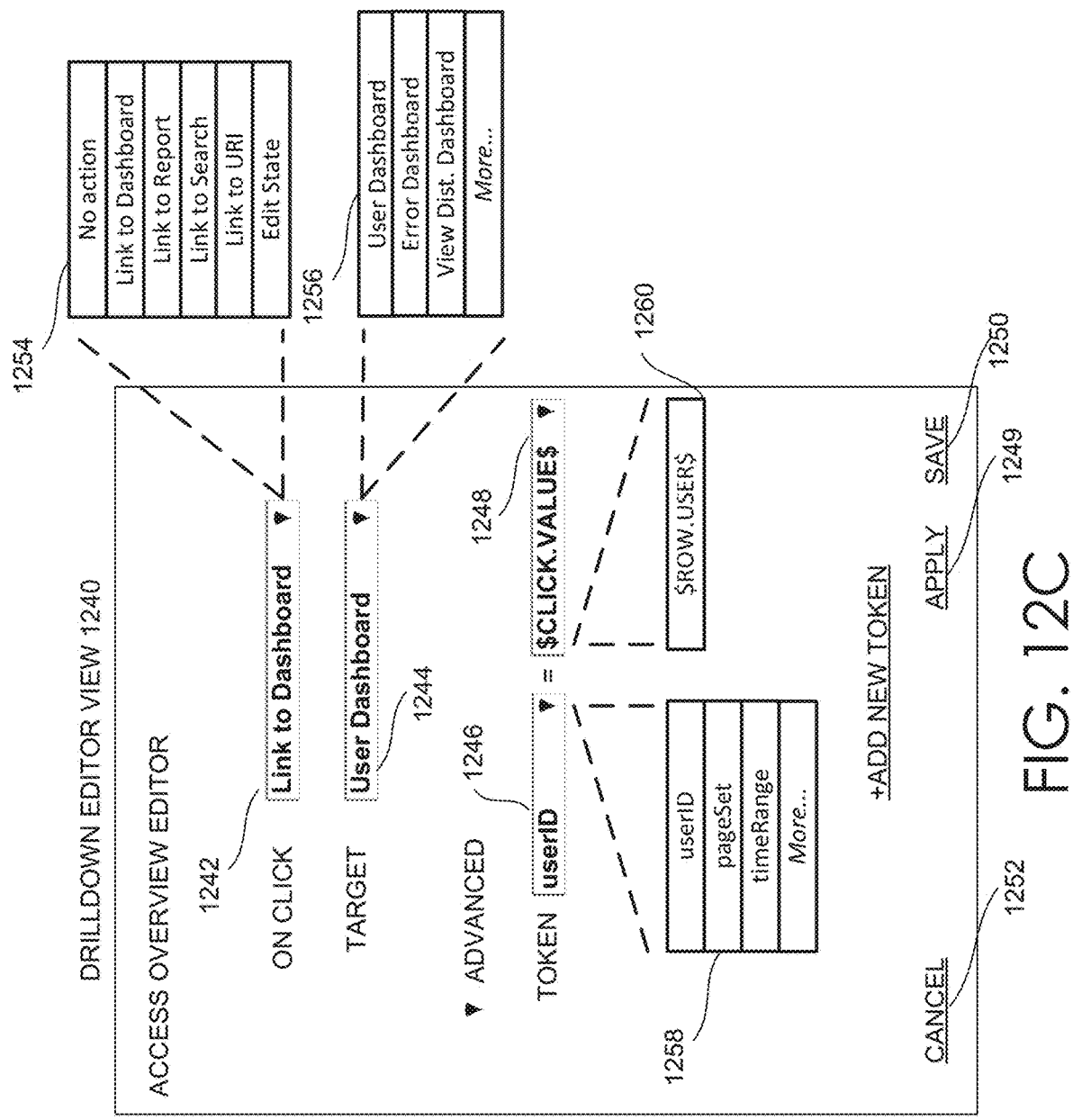

FIGS. 12A-C illustrate example user interfaces depicting summarizations of data within a dataset and for facilitating linking between summarizations based on affinities. Each of the interfaces of FIGS. 12A-C may be generated on a computing device (e.g., a client device 102) based on execution of an application or other computer-executable code. In one embodiment, each of the interfaces FIGS. 12A-C may be generated by a browser application execution on a computing device, and may represent a rendering of a network data object, such as a hypertext markup language (HTML) file. As will be appreciated by one skilled in the art, an HTML file or other network data object may include markup language denoting a structure of information to be displayed when the file is rendered by a browser application. The network data object may be made available, for instance, at a uniform resource identifier (URI) of a communications network. In some instances, an HTML file or other network data object may include computer-executable code, sometimes referred to as "client-side scripting," that is executable by a computing device to provide functionality to the interface. One common example format of such client-side scripting is the JAVASCRIPT™ code format. In some instances, a network data object may include or reference additional network data objects, such as extensible markup language (XML) files or cascading style sheet (CSS) files, that work in combination to define an interface. In the illustrative examples of FIGS. 12A-C, it will be assumed that the interfaces represent renderings of an HTML file including or referencing a XML content that (at least partly) defines a structure of the interfaces. It will further be assumed that the HTML file includes or references client-side scripting executable to interpret the XML content and generate the interface. Illustratively, the client-side scripting may read from an XML file a number of elements to be included in the interface, and populate the elements with relevant data. In some instances, that data may be a result of a search against raw machine data, and thus may be retrieved from a network resource, such as a search head 210 of FIG. 2. As discussed below, the client-side scripting may further be executable (independently or in conjunction with code executing on a remote device) to determine affinities between summarizations of data, and to provide an intuitive interface enabling a user to view suggested affinities and to modify functionality of the interface according to the affinities. For example, the client-side scripting may be executable to modify a "drill down" behavior of a first summarization displayed in accordance with a network data object, such that selection of an element within the summarization causes display of a second summarization that has an affinity to the first summarization.

With reference to FIG. 12A, an illustrative "dashboard" view 1200 user interface is shown. Generally described, a dashboard may refer to an interface that depicts a collection of one or more summarizations of an underlying data set (such as raw machine data). In one embodiment, the summarizations are generated by application of a late-binding schema to the data set, in accordance with embodiments described above. In another embodiment, the summarizations are generated based on executing a query on structured or pre-processed data, such as by parsing, searching, processing, or filtering information within a relational database.

For the purposes of illustration, the dashboard view 1200 is depicted as a summarization of information regarding a network resource site, denoted in FIG. 12A as "My Site" 1218. The site may, for example, correspond to a web site available on a global area network (GAN), such as the Internet. In this regard, the dashboard view 1200 may provide summarizations of server logs or access logs corresponding to the site. In FIG. 12A, three summarizations are included within the dashboard view 1200: an indicators summarization 1202, an access overview summarization 1204, and a browser type summarization 1206, each discussed in more detail below.

The indicators summarization 1202 of FIG. 12A provides a number of "indicators" regarding underlying data, such as a number of total views of a site, a number of "views today" of the site, number of "errors today," and a most common error. In the illustration of FIG. 12A, the total views may indicate a total number of accesses of the site (e.g., of a network data object corresponding to the site) by client computing devices, as indicated in underlying data. The "views today" may indicate accesses to the site in a 24 hour period, as indicated in the underlying data. The "errors today" may indicate errors in accessing the site, as indicated in the underlying data. The "most common error" may reflect an error type identifier most common among the errors in a given 24 hour period, as indicated in the underlying data. In FIG. 12A, the "most common error" type is shown as error type 503, an error defined by the hypertext transport protocol (HTTP) that indicates "service unavailable." Each indicator may be generated, for example, by executing a query on raw machine data in accordance with embodiments described above.

The access overview summarization 1204 of FIG. 12A represents various accesses to the site by different users (e.g., each representing a set of access credentials to the site, a specific client computing device, etc.). Specifically, each row of the table shown in the overview summarization 1204 may include a username (denoted as "user.name," where "user" can represent an object in accordance with an object-oriented programming model and name can represent an attribute of the object), an error count (denoted as "error-Count") indicating errors returned to a device of the user, and a number of views (denoted as "numberOfViews") indicating access of the site by a device of the user. The access overview summarization 1204 further includes a control element 1210 selectable to view different rows of the table shown in that summarization. For example, a user could select "2" of the element 1210 to view additional rows, each corresponding to a username, error count, and number of views. Thus, the access overview summarization 1204 provides an intuitive review of logs of the site grouped according to user name.

The browser type summarization 1206 depicts another summarization of underlying data regarding operation of the site. Specifically, the browser type summarization 1206 depicts a pie chart of various "browser types" accessing the site. Illustratively, each slice of the pie chart can represent a different browser application used to access the site (or, potentially, a different "user-agent" string included in requests to access the site), and the size of the slice can represent an overall proportion of total accesses of the site represented by each browser application. Thus, the browser type summarization 1206 provides an intuitive review of the types of browser applications accessing the site.

To enable further review of information regarding the site, one or more of the data elements shown in FIG. 12A may be selectable to view additional information regarding that data element. For example, each of the numbers within the indicators summarization 1202 may be selectable to view additional information regarding that indicator. Each of the entries in the table of the access overview summarization 1204 (e.g., each username, error count and number of views) may be selectable to view further information regarding that entry. Each of the slices of the pie chart of the browser type summarization 1206 may be selectable to view addition information regarding a browser application type represented by the slices. In one embodiment, selection of a data element within the dashboard view 1200 may cause display of a second summarization that uses, as an input, data associated with the selected data element.

One example of such a second summarization is shown in FIG. 12B, as the "user view" dashboard 1220. Specifically, the user view dashboard 1220 may provide a summarization of a data set (e.g., access logs to the site) with respect to an individual user of the site, such as an entity defined by a set of access credentials or an individual client computing device. In the example of FIG. 12B, the user view dashboard 1220 may be displayed based on a user selection of a data element within the access overview summarization 1204 of FIG. 12A that represents an individual user. For example, the user view dashboard 1220 may be displayed based on a user selection of data element 1208 of FIG. 12A, representing username "userF." The selected data element may then be used to customize the information represented within the user view dashboard 1220.

In the example of FIG. 12A, a user identifier (denoted in FIG. 12B as "userID84") that corresponds to "userF" has been retrieved, and used as an input within the input field 1222. Thus, the data shown in the dashboard 1220 reflects portions of underlying data associated with the user identifier. Specifically, the dashboard 1220 includes a set of indicators 1224 associated with the user identifier (including total views, views today, errors, and a most common error). Illustratively, data within the input field 1222 may be altered to view indicators corresponding to another user. While the indicators 1224 are depicted as similar to indicators 1202 of FIG. 12A (albeit reflecting a single user rather than all accesses to a site), different dashboards may in other embodiments include different indicators regarding underlying data.

The user view dashboard 1220 further includes a "view details" summarization 1228, providing information regarding accesses to a site by the user identified in the input field 1222. Each row of the view details summarization 1228 can reflect a single transaction between a client device associated with the user identifier and a server associated with the site. The columns within the view details summarization 1228 illustrated reflect a time of that transaction, a network data object requested by the client device, an error detected in the transaction (if any), and a time (in milliseconds) needed by the server to respond to the request. Like the data elements of FIG. 12A, the data elements of FIG. 12B (e.g., the indicators 1224 and the individual entries of the view details summarization 1228) may be selectable to view additional information within a data set pertaining to a selected data element.

In one embodiment, the specific action taken when selecting a data element may be specified in a predefined configuration file. For example, an owner of a dashboard (e.g., a site administrator) may specify that, after selection of a data element, a user should be taken to another dashboard, to a specific summarization (e.g., separate from a dashboard), a search screen (such as the search screen 600 of FIG. 6A), or a specific URI. As another example, an owner of a dashboard may specify that, after selection of a data element, a state of a current summarization or dashboard should be altered, such as by varying the state of an input to that summarization or dashboard (e.g., the input 1222). As used herein, reference to an owner of a dashboard can include reference to any user with any control over the behavior of the dashboard. As such, the term owner can refer to a user, a designer, an administrator, or the like.

An owner of a dashboard may further specify information to be passed to a destination summarization, dashboard, or URI. This information can be generally referred to as "tokens" and represent variable information used by a destination summarization, dashboard, or URI. For example, where dashboards or summarizations correspond to data objects accessible via HTTP, tokens may be passed as HTTP POST or HTTP Get elements. Thus, when a user interacting with a dashboard selects a data element, the user may be redirected to an owner-specified destination, and information regarding the selected data element may be passed as a token to the destination. In one embodiment, the information is a value of the selected data element. For example, selecting data element 1208 on FIG. 12A may cause the value "userF" to be passed as a token to a destination. In another embodiment, the information may be a field corresponding to the selected data element. For example, selecting data element 1208 on FIG. 12A may cause the field identifier "user.name" to be passed as a token to a destination. In still more embodiments, a token may include information associated with a selected data element. For example, a selected data element may represent a user name, but a destination summarization may be configured to receive as input a user identifier (rather than a user name). Thus, an owner of a dashboard may configure the dashboard such that when a "user name" data element is selected, the corresponding "user identifier" value is located and passed as a token to a destination. Illustratively, the association between a selected data element and a value of a token may be specified as a hierarchical data relationship according to object oriented dot notation (e.g., "$row.user.id$") or as a function corresponding to code that retrieves a desired token value according to a selected data element (e.g., "getID ($row.user.name$)").

In one embodiment, the action to be taken when a data element, as well as the token information to be passed to a destination, can be manually specified by an owner of a summarization or dashboard. For example, the owner may manually modify XML, of a data object to identify the action to be taken when a data element is selected, destination, and token information to be passed to the destination. However, as noted above, it may be difficult or impossible for a user to manually specify all actions for all summarizations, particularly where numerous visualizations for data exist. Thus, it is beneficial to provide an intuitive interface for specifying actions, destinations, and tokens corresponding to data elements of a summarization. It is further beneficial to provide automatic identification of affinities between summarizations, such that a user can be provided with suggested destination summarizations for actions taken with respect to a first summarization.

One example of such an intuitive interface is shown in the drilldown editor view 1240. The drilldown editor view 1240 may correspond, for example, to a separate interface from those of FIGS. 12A and 12B, or to an overlay interface within the interfaces of FIG. 12A or 12B. In the illustrative example of FIG. 12C, the drilldown editor view 1240 provides a user (e.g., an owner of a summarization or an administrator) with the ability to customize the drill down action of the "access overview" summarization 1204 of FIG. 12A. The drilldown editor view 1240 may be shown, for example, in response to selection of the "edit" control 1214 of FIG. 12A. Similar interfaces may be shown in response to edit control 1216 of the browser type summarization 1206 or the edit control 1226 of the user view dashboard 1220, each of which may enable customization of actions to be taken on user selection of data elements of the respective summarizations or dashboards. In some instances, the drilldown editor view 1240 may be shown in other contexts, such as during the creation of a dashboard or other establishment of a summarization (e.g., (e.g., as part of a guided setup process or during an initial configuration of a summarization).

As shown in FIG. 12C, the drilldown editor view 1240 provides a an input control 1242 enabling selection of an action to be taken on user selection of data elements within the access overview summarization 1204. In the particular example shown in FIG. 12C, the input control is depicted as drop-down menu populated with list of predetermined or dynamically determined potential actions. In other embodiments, the input control 1242 can include other inputs types, such as text fields, radio buttons, and the like. An illustrative list of potential actions is shown as table 1254 within FIG. 12C, including linking to another dashboard (e.g., a predetermined collection of summarizations), linking to a report (which may represent an individual summarization), linking to a search (such as the search interface 600 of FIG. 6A), linking to a URI, or editing a state of the access overview summarization 1204 (such as by modifying tokens associated with the access overview summarization 1204). Each of the actions may be predetermined based on functionalities available to the access overview summarization 1204.

For actions that require specification of a destination (e.g., "link to dashboard," "link to report," "link to search," or "link to URI"), the drilldown editor view 1240 can further provide an input control 1244 enabling specification of the destination. In one embodiment, the destination may be selected from a drop-down input or manually entered by a user.

Where input is selected from a drop-down input, the drilldown editor view 1240 may provide suggestions as to potential destinations (e.g., additional summarizations), based on an affinity between the source summarization (here, the access overview summarization 1204) and the potential destination summarizations (e.g., within a dashboard, report, search, etc.). Determination of affinities between a source summarization and a potential destination is described in more detail below. However, in brief, a computing device (such as the computing device generating the drilldown editor view 1240 or a network computing device) may compare attributes of the source summarization with attributes of a potential destination summarizations to determine a relationship between the two summarizations, and rank potential destination summarizations according to a strength of that relationship. Illustratively, where an output of a source summarization is a valid input to a potential destination summarization, the potential destination summarization may be ranked highly within a list of potential destination summarizations. Where an output of a source summarization is not a valid input to a potential destination summarization, the potential destination summarization may be ranked low within a list of potential destination summarizations, or excluded from the list entirely.

For example, within the table 1256, three dashboards are identified, each including a potential destination summarization: a user dashboard, a view distribution dashboard, and an error dashboard. The ordering of these dashboards represents an illustrative affinity between the access overview summarization 1204 and summarizations included within the destination dashboards. Specifically, inclusion of the "user dashboard" at the top of the table 1256 indicates a strong affinity between the access overview summarization 1204 and the user dashboard (which may, for example, correspond to the user view dashboard 1220 of FIG. 12B). This affinity, for example, may be reflective of an input of the user dashboard (e.g., a user identifier) corresponding strongly with a grouping of information in the access overview summarization 1204 (where each row indicates user-specific data). Inclusion of the "error dashboard" indicates a slightly weaker affinity between the access overview summarization 1204 and the error dashboard. This weaker affinity may reflect, for example, that an input to the error dashboard (e.g., one or more errors) corresponds to a data element selectable on the access overview summarization 1204 (e.g., a per-user error count), but that the selectable data element is not a grouping criteria for the access overview summarization 1204 (e.g., the rows of the access overview summarization 1204 reflect per-user, not per-error data). Similarly, inclusion of the "view distribution dashboard" indicates a still weaker affinity between the access overview summarization 1204 and the view distribution dashboard. This still weaker affinity may reflect, for example, that an input to the view distribution dashboard (e.g., one or more page views) corresponds to a data element selectable on the access overview summarization 1204 (e.g., a per-user page view), but that the selectable data element is not a grouping criteria for the access overview summarization 1204 (e.g., the rows of the access overview summarization 1204 reflect per-user, not per-error data) and that the view distribution dashboard is not as popular as the error dashboard.

In one embodiment, the selectable destinations in table 1256 initially contain a threshold number (e.g., 3) suggested destinations, or initially contain a number of suggested destinations with at least a threshold affinity to the source summarization (e.g., the access overview summarization 1204). Selection of any entry in the table 1254 (e.g., from a drop down list) may cause the value corresponding to the entry to be populated in the input 1242. Selection of the final element in the table 1256 ("More . . . ") may cause display of additional suggested destinations, such as those above the threshold number, below the threshold affinity, or both.

In some instances, it may not be necessary for a user to specify a destination after user interaction with a summarization. For example, the "edit state" action may correspond to a modification of tokens on a current summarization, and thus, the current summarization or dashboard can be assumed to be a destination for the action. Thus, no destination need be specified in the drilldown editor view 1240.

As noted above, a destination summarization (or collection of summarizations, as represented for example by a dashboard) can utilize tokens to customize the information of the summarization. Thus, in addition to specifying an action to be taken in response to selection of a data element and a destination for that action, the drilldown editor view

1240 can enable a user to specify what tokens (if any) should be passed to a destination, and the value of that token relative to a selected data element in the source summarization.

Specifically, the drilldown editor view 1240 can provide an input 1246 to enable manual entry of a token, or selection of a token from a list. One illustrative list of potential tokens is shown in FIG. 12C as table 1258. Each entry in the table 1258 can represent a token available on the currently selected destination (here, the user dashboard). For example, the table 1258 notes that the user dashboard can take as inputs a user identifier, a page set (e.g., specific pages of the site for which user information is requested), and a time range (e.g., a specific range of time for which user information is requested). Like suggested destination summarizations discussed above, the tokens suggested in table 1258 can be ordered based on affinities; specifically, an affinity between an individual token and data elements associated with the source summarization (here, the access overview summarization 1204). For example, the user identifier token may have a relatively high affinity to the access overview summarization 1204, because the data elements of the access overview summarization 1204 are grouped according to user. The page set and time range tokens may have relatively low affinities with the access overview summarization 1204, because the type of values taken by those tokens (e.g., a set of pages or a range of time) may not be directly represented by the data elements shown by the access overview summarization 1204 (though they may be derivable from those data elements, as discussed in more detail below). Like the entries in table 1254, the entries of table 1258 (here, tokens) may include a threshold number of entries, entries above a threshold affinity, or a combination thereof. Selection of any entry in the table 1258 (e.g., from a drop down list) may cause the value corresponding to the entry to be populated in the input 1246. Selection of the final element in the table 1258 ("More . . . ") may cause display of additional suggested tokens, such as those above the threshold number, below the threshold affinity, etc.

Still further, the drilldown editor view 1240 can include an input 1248 enabling identification of the value to be passed to the token selected via input 1246. The value of input 1248 may represent a placeholder or variable that resolved on selection of a data element from the source summarization. For example, the value may the particular selected data element (represented in FIG. 12C as "$click.value$") or a data element corresponding to the selected data element (e.g., a user data object corresponding to the selected row of a table). Like inputs 1244 and 1246, the value of input 1248 may be manually specified or selected from a list of suggestions. One potential list of suggestions is shown in table 1260, and includes the "$row.user$" object, which corresponds to a particular user, and which matches the type of value accepted by the token designated in input 1246. Where more than one variable related to a selected data element matches the type of value accepted by the token designated in input 1246, each potential variable may be included in a displayed list. Selection of any entry in the table 1260 (e.g., from a drop down list) may cause the value corresponding to the entry to be populated in the input 1248.

The drilldown editor view 1240 can include additional controls enabling a user to cancel the selections made in inputs 1242-1248, apply those selections, or save the selections. Specifically, a user may select the cancel input 1252 to discard the selections and return to a prior interface (e.g., the dashboard view 1200 of FIG. 12A). A user may select the apply input 1249 to accept the selections and modify the functionality of the relevant summarization, such that they are returned to a prior interface and such that selection of a data element in the relevant summarization causes the action specified in the drilldown editor view 1240 according to the values of inputs 1242-1248. A user may select the save input 1250 to persist the selections across multiple viewing sessions, such as by modifying a configuration of the summarization in a data storage device. Where a summarization is generated as a result of rendering a data object, the save input 1250 may cause the data object to be modified. For example, the save input 1250 may cause the values of inputs 1242-1248 to be recorded within XML data corresponding to the summarization, such that all renderings of the summarization include the functionality denoted by the inputs 1242-1248.

Thus, by utilization of the drilldown editor view 1240, a user may intuitively modify functionality associated with selection of a data element within a first summarization, and link such selection to a second summarization (e.g., as represented by or within a dashboard, report, set of search results, etc.). Moreover, a user may be provided with a list of suggested summarizations, based on an affinity between the first summarization and the suggested summarizations. A user may further be provided with a list of suggested tokens to pass to the second summarization, based on an affinity between the suggested tokens and the data elements of the first summarization. In accordance with embodiments described above, the second summarization may in some instances be generated by execution of a new query against a data set, the query being generated based on tokens passed to the second summarization. Thus, individual data elements of a first summarization may be made selectable to execute a query against a data set based at least in part on the selected data element (or other data associated with the selected data element).

3.2 Summarization Attributes

Figure 13:
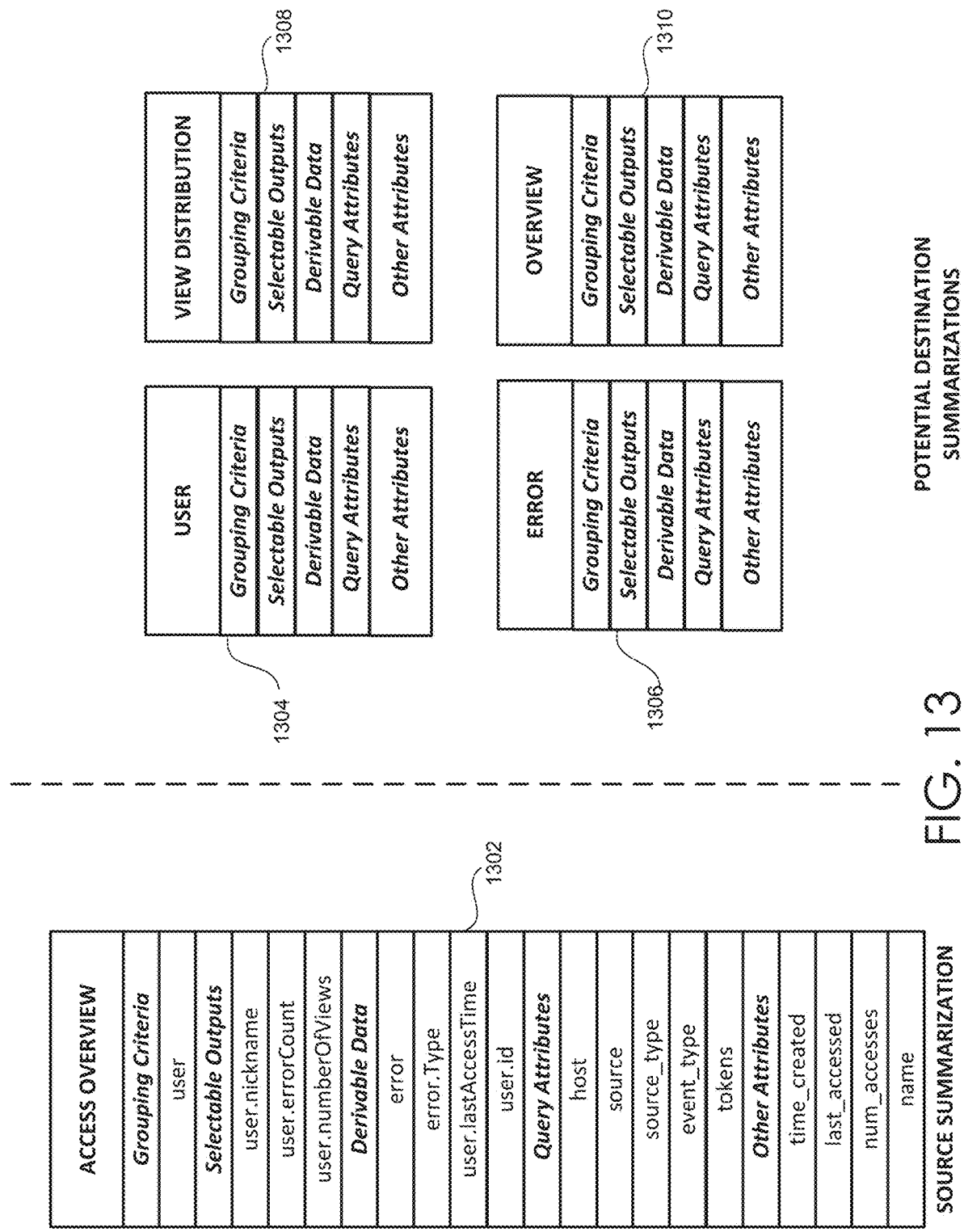
FIG. 13 depicts a source summarization of a data set and multiple potential target summarizations that may be related to the source summarization, as well as data related to both the source summarization and the multiple target summarizations that may be used to determine an affinity between the summarizations.

With reference to FIG. 13, an illustrative visualization of attributes of summarizations that may be compared to determine affinities between summarizations will be described. Specifically, FIG. 13 depicts a table 1302 of attributes associated with a source summarization (e.g., from which a data element may be selected) and a tables 1304-1310 of attributes associated with potential destination summarizations. For the purposes of illustration, the source summarization in FIG. 13 will be assumed to be the access overview summarization 1204 of FIG. 12A, while the potential destination summarizations will be assumed to be four dashboards: a user dashboard (e.g., corresponding to the user view dashboard 1220 of FIG. 12B), a view distribution dashboard (e.g., to display information as to what pages have been viewed on a site), an error dashboard (e.g., to display information as to errors noted within logs of the site), and an overview dashboard (e.g., corresponding to the dashboard view 1200 of FIG. 12A).

As shown in table 1302, the attributes of the source summarization illustratively include a grouping criteria, one or more selectable outputs, one or more types of derivable data, one or more query attributes, and one or more dashboard attributes. Grouping criteria can correspond to criteria by which data elements within a visualization are grouped or partitioned for purposes of summarizing underling data. In the case of the access overview summarization, this grouping criteria may include the "user" data type, as the rows of table within the access overview summarization reflect data on a per-user basis. In the case of other summarizations, such as the browser type summarization 1206 of FIG. 12A, other grouping criteria may exist, such as a browser type attribute.

Selectable outputs can correspond to data elements displayed by a summarization. In the case of the access overview summarization, these elements may be a user nickname, a user error count, and a number of page views of the user. In the case of other summarizations, such as the browser type summarization 1206 of FIG. 12A, these elements may include a total number or overall proportion of users with a given browser type.

Derivable data can correspond to data elements not displayed or used as grouping criteria within a summarization, but derivable from or otherwise associated with those data elements or grouping criteria. For example, derivable data may include an identifier of a user, since that identifier is an attribute or data field associated with a "user" data object. Derivable data may further include the last access time of a user on the site, an error object (e.g., corresponding to an error identified within the user error count data object), or an error type (e.g., corresponding to that error). Various additional examples of derivable data may exist depending on the data elements shown in a summarization. In one embodiment, derivable data may refer specifically to fields or attributes of a data element or grouping criteria (e.g., elements that are hierarchically nested within an object corresponding to the data element or grouping criteria). In another embodiment, derivable data may include parent data objects of data elements or grouping criteria, or data objects sharing a common parent data object. In still other embodiments, a user may be enabled to create customized data attributes, by specifying a relationship between a data element or grouping criteria and the customized data attributes (e.g., by specifying a function or hierarchical relationship within an object oriented model).

Query attributes of a source summarization can correspond to attributes or parameters of a query associated with the source summarization. Queries are discussed in more detail above; however, in brief, query attributes may include a host field, source field, or source type field specified within a query, an event type searched by the query, or other tokens (e.g., parameters) or token types taken by the query.

Other attributes can correspond to attributes of a summarization itself, as opposed to the underlying data of the summarization. By way of a non-limiting example, other attributes can include a name of the summarization, a time that the summarization was created or last modified (e.g., a time at which a user defined a configuration of the summarization), a time that the summarization was last accessed or executed to summarize data with a data set, or a number of accesses to the summarization (e.g., indicative of a popularity of the summarization).

In a similar manner to the source summarization, each potential destination summarization can be associated with grouping criteria, selectable outputs, derivable data, query attributes, and other attributes. The specific attributes of each summarization can vary according to the configuration of that summarization. In instances where a potential destination represents a collection of summarizations (e.g., as a dashboard including multiple summarizations), the dashboard may inherent attributes of each summarization within its collection, as well as having attributes of its own (such as a time created, time last accessed, number of accesses, etc.).

As described in more detail below, a computing device (e.g., client device 102 or a host device 106 of FIG. 1) may compare attributes of a source summarization with attributes of potential destination summarizations to determine affinities between the source and potential destination summarizations. The computing device may then suggest a summarization to a user as a potential destination summarization based on the determined affinities. In one embodiment, the suggestions may be included in a list ordered by affinities, as discussed above with respect to FIG. 12C. Thus, a user may be enabled to select a suggested summarization as a destination summarization, without being required to manually specify the destination summarization.

While four potential destination summarizations are shown in FIG. 13 for illustrative purposes, any number of summarizations may be considered as potential destination summarizations for a source summarization. In one embodiment, all existing summarizations are considered as potential destination summarizations. In another embodiment, only a subset of summarizations meeting threshold criteria are considered as potential destination summarizations. This threshold criteria may include, for example, sharing a common host, host type or source type query attribute with the source summarization.

3.2 Suggesting Summarizations Based on Affinities

Figure 14:
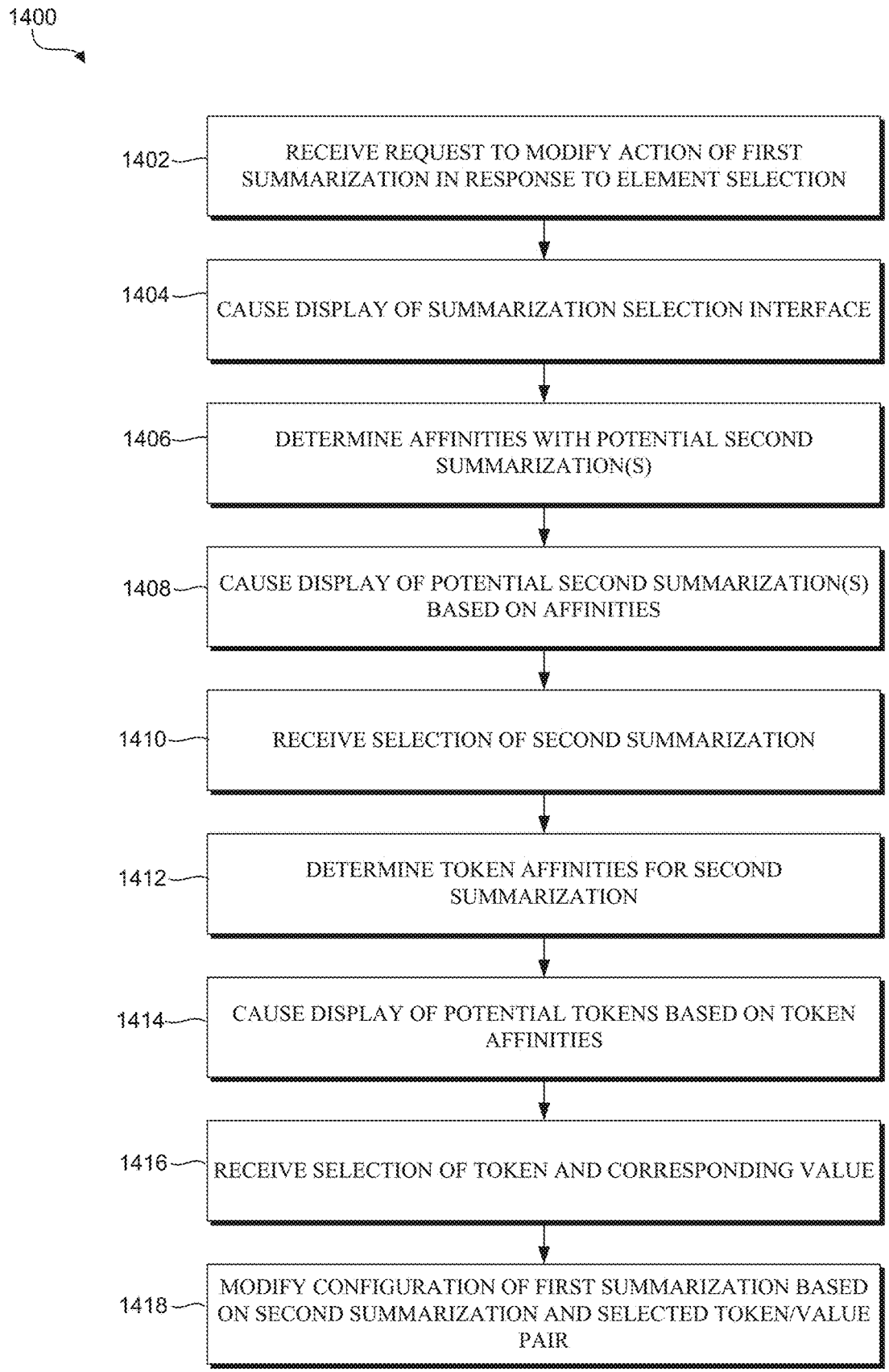
FIG. 14 is a flow diagram that illustrates how a user interface may be provided to suggest correlations between summarizations of a data set based on affinities between the summarizations.

With reference to FIG. 14, one illustrative routine 1400 for modifying drilldown or other selection functionality of a first summarization is described. Specifically, the routine 1400 enables modification of such functionality via an intuitive interface, such as the drilldown editor view 1240 of FIG. 14, including a list of suggested summarizations according to affinities of the suggested summarizations with the first summarization. The routine 1400 further enables selection of tokens to be set on a selected destination summarization based on affinities of those tokens with data of the first summarization. The routine 1400 may illustratively be implemented by client-side scripting executing on a client computing device (e.g., client computing device 102 of FIG. 1) by virtue of loading a network data object, such as an HTML formatted page. In another embodiment, the routine 1400 may be implemented by a host computing device (e.g., host device 106 of FIG. 1) based on information obtained from a client device.

The routine 1400 begins at block 1402, where the computing device receives a request to modify an action of the first summarization when a data element of the summarization is selected. The request may be received, for example, via selection of an "edit" button for the summarization, such as the edit inputs 1214 or 1216 of FIG. 12A. In other instances, the request may be received based on client navigation to a specific network data object, such as an HTML, page associated with configuration of a summarization.

At block 1404, the computing device causes display of a summarization selection interface, such as the drilldown editor view 1240 of FIG. 12C. Illustratively, where the computing device is a client computing device, the computing device may cause display of the interface by use of client-side scripting executing on the device. Where the computing device is a host computing device, the computing device may cause display of the interface by transmitting a network data object (e.g., an HTML page) to a client device or otherwise instructing the client device to display the interface.

At block 1406, the computing device determines affinities of potential second summarizations with the first summarization. An illustrative routine for determining affinities between summarizations is described in more detail below with respect to FIG. 15. However, in brief, the computing device may determine affinities of potential second summarizations with the first summarization by comparing attributes of the two summarizations and determining a compatibility or similarity between the attributes. In some instances, the computing device may combined multiple comparisons between different attributes (e.g., according to a weighted linear combination) to determine an overall affinity for two summarizations.

At block 1408, the computing device causes display of a listing of potential second summarizations based on affinities of those potential second summarizations to the first summarization, as determined in block 1406. In one embodiment, the listing of potential second summarizations is provided as a drop-down list or other selectable list in the summarization selection interface.

While a listing based on affinities is described herein, the listing may further be ordered based on a predicted popularity or time-relevance of a potential second summarization. For example, a potential second summarization that has been accessed a high number of time may be more likely to be relevant than a potential second summarization that has been accessed a low number of times. In some instances, relevance may be time-weighted, such that recent accesses are more likely to indicate relevance than less recent accesses. Various additional or alternative ranking criteria may be used to order a listing of potential second summarizations.

At block 1410, the computing device receives selection of a potential second summarization. Illustratively, selection of a second summarization may cause the second summarization to be identified as a target summarization, to be viewed when a data element of the first summarization is selected. Thus, subsequent to implementation of routine 1400, a user can be enabled to select a data element within the first summarization to display the selected second summarization.

At block 1412, the computing device determines affinities between tokens of the second summarization and data elements output by or derivable from the first summarization. An illustrative routine for determining affinities for tokens is described in more detail below with respect to FIG. 16. However, in brief, the computing device may determine affinities of tokens by comparing values accepted by the tokens (e.g., data types of the tokens) with data elements output by or derivable from the first summarization. The computing device may then determine an affinity of the token as a likelihood that data elements output by or derivable from the first summarization would be used to set the value of the token.

At block 1414, the computing device causes display of a listing of tokens for the selected second summarization based on affinities of those tokens to data of the first summarization, as determined in block 1414. In one embodiment, the listing of tokens is provided as a drop-down list or other selectable list in the summarization selection interface.

At block 1416, the computing device receives selection of a token, as well as identification of a value to be set for the selected token (e.g., as specified relative to a selected data element of the first summarization). In some embodiments, the value may be selected based on one or more suggested values. The suggested values may be determined by the computing device based on types of data elements output by the first summarization, as well as data elements derivable from those output data elements (e.g., as child or parent objects in an object-oriented hierarchy). For example, the suggested values may include any output or derivable data elements that match a data type allowed by the selected token. The computing device may then cause presentation of the suggested values via the summarization selection interface for selection by the user.

In some embodiments, the computing device may enable a user to specify data manipulations to be applied to the value prior to setting the token. For example, the computing device may present an interface enabling a user to specify a substring within the value to set as a token, or to other string or mathematical operations on the value prior to setting the token.

At block 1418, the computing device modifies a configuration of the first summarization to denote the selected second summarization, selected token, and corresponding value for the selected token. Illustratively, the computing device may modify a state of computer-executable code (e.g., client-side scripting) corresponding to the first summarization. In another embodiment, the computing device may modify markup language corresponding to the first summarization (e.g., XML content) to identify the second summarization as a destination summarization when a data element of the first summarization is selected. The computing device may further modify the markup language to identify the token to be set on selection of the data element, and to identify a value to be set for the token relative to the selected data element. Thus, a user can be enabled to interact with data elements of the first summarization to display the selected second summarization according to the designated value of the token. Users can therefore further explore and interact with an underlying data set represented by the first and second summarizations. The routine 1400 can thereafter end.

It will be appreciated that the blocks of routine 1400 may be modified in various embodiments of the present disclosure. For example, the arrangement of blocks may be modified in a number of ways, such as by implementing block 1406 prior to block 1404, etc. Moreover, one or more blocks may be omitted. For example, blocks 1412-1416 may be omitted if a user does not wish to set a token for a second summarization, or if setting of tokens is enabled for the second summarization. Still further, one or more blocks may be added to the routine 1400. For example, the routine 1400 may be modified to enable selection of a type of action to be taken in response to selection of a data element of the first summarization, such as by linking to a specific type of summarization (e.g., a dashboard including a collection of summarizations, a search report, etc.). Various other modifications to the routine 1400 may be made without departing from the present disclosure.

3.3 Determining Affinities

Figure 15:
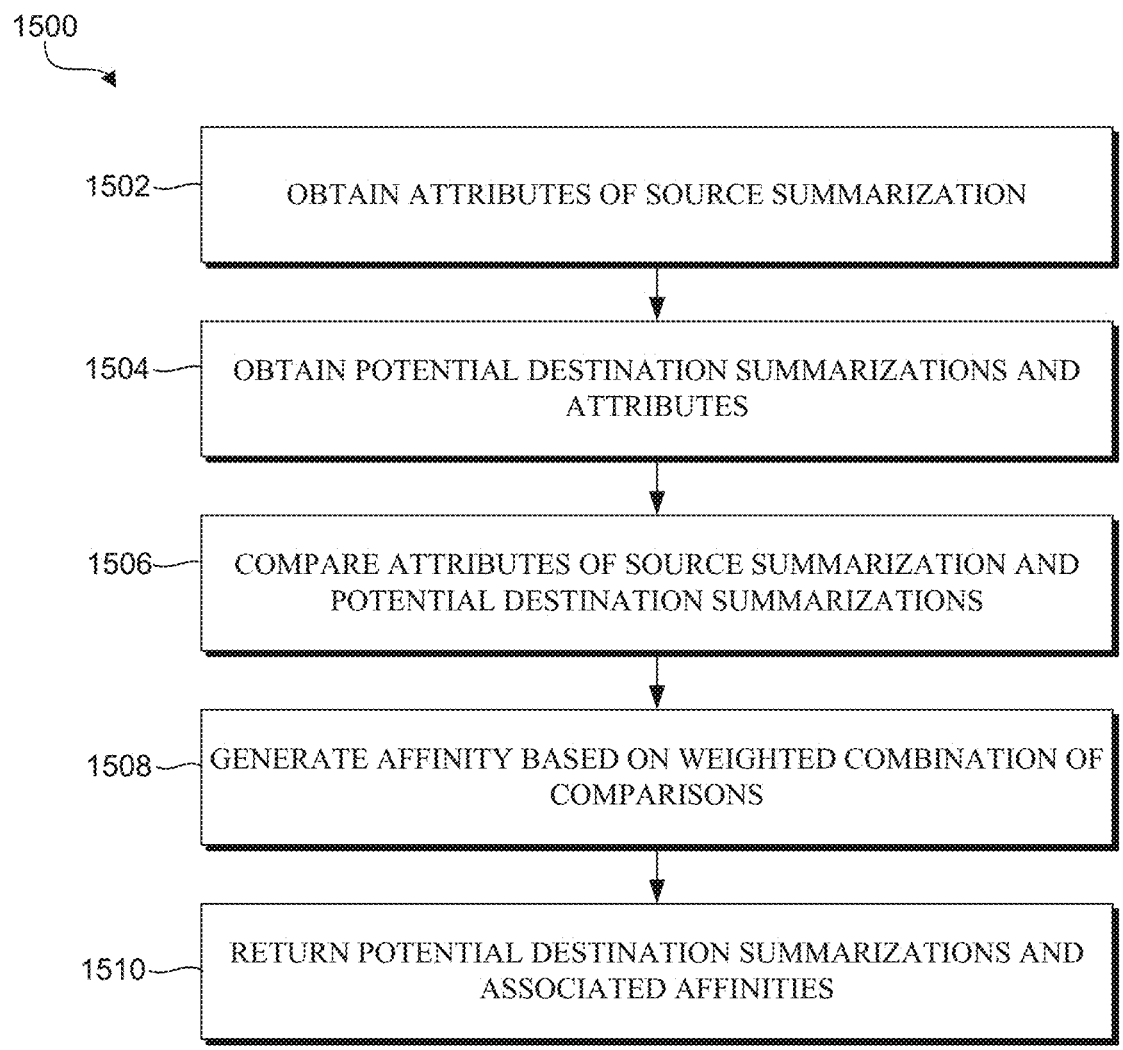
FIG. 15 is a flow diagram that illustrates how affinities between summarizations may be determined based on data corresponding to the summarizations.

With reference to FIG. 15, one illustrative routine 1500 for determining affinities between a first summarization (denoted in FIG. 15 as a source summarization) and one or more potential second summarizations (denoted in FIG. 15 as potential destination summarizations) will be described. The routine may be implemented, for example, as a subroutine of the routine 1400 of FIG. 14 (e.g., as an implementation of block 1406 of FIG. 14).

The routine 1500 begins at block 1502, where the computing device obtains attributes of the source summarization. As discussed above with respect to FIG. 13, attributes may include grouping criteria for data elements output by a summarization, the specific data elements output in the summarization, data elements derivable from the output data elements, attributes of a query underlying the summarization, and other attributes of the summarization (such as a name of the summarization, creation or modification time, time of last access, or number of accesses).

At block 1504, the computing device identifies potential destination summarizations and similarly obtains attributes for those potential destination summarizations. In one embodiment, the computing device considers all existing summarizations as potential destination summarizations for the source summarizations (potentially including the source summarization itself). In another embodiment, the computing device identifies potential destination summarizations based on a set of threshold comparison criteria to the source summarization, such as a sharing of specific query attributes (e.g., a common event type or source type). Like the source summarization, attributes of destination summarizations can include grouping criteria, output data elements, derivable data elements, query attributes, and other attributes.

At block 1506, the computing device compares the attributes of the source summarization with the attributes of each potential destination summarization to determine an affinity between the summarizations. In one embodiment, the specific attributes to be compared may be pre-determined. Illustratively, such comparisons may include:

- A comparison of grouping criteria of the source summarization with tokens that may be set for the potential destination summarization;
- A comparison of data elements output by the source summarization with tokens that may be set for the potential destination summarization;
- A determination of common query attributes between the source summarization and the potential destination summarization;
- A comparison of data elements derivable from outputs of the source summarization with tokens that may be set for the potential destination summarization;
- A comparison of identifiers of grouping criteria, output data elements, or derivable data elements of the source summarization with a name of the potential destination summarization; and
- A comparison of the names of the source summarization and the potential destination summarization.

Embodiments of the present disclosure may include other potential comparisons. For example, where a comparison includes tokens that may be set for the potential destination summarization, two comparisons may be made: a first that compares to tokens of the potential destination summarization set via input forms on the potential destination summarization, and a second that compares to tokens of the destination summarization not set via input forms. This may be beneficial, for example, where setting a token via input form potentially indicates a higher importance of the token relative to tokens not set via input form. Thus, a similarity between elements associated with a source summarization and a token of a destination summarization set via input form can indicate a high affinity between the summarizations.

In one embodiment, comparisons may result in a binary value (zero or one) indicating whether a similarity does or does not exist between the compared values (e.g., whether a grouping criteria of a source summarization corresponds to a data type used as a token in a destination summarization). In another embodiment, comparisons may result in a non-binary value indicative of the affinity indicated by the comparison. For example, a comparison of identifiers of grouping criteria, output data elements, or derivable data elements of the source summarization with a name of the potential destination summarization may indicate a similarity between the identifiers and the name (e.g., as a number of words or characters shared between an identifier and the name). As another example, a comparison of tokens input to a potential destination and data elements derivable from outputs of a source summarization take a value that indicates a distance of the derivable data element from actual outputs of a source summarization. Illustratively, if an input of a destination summarization corresponds to a data element three hierarchical levels removed (e.g., as a great-grandchild object) from an output of the source summarization, the comparison may take a value of three, and the value may be inversely proportional to an affinity between summarizations indicated by the affinity.

In some embodiments, the comparisons between attributes of source and potential destinations summarizations may be determined at least in part based on application of a machine learning algorithm. Illustratively, one or more computing devices may collect data reflective of source summarizations, potential destination summarizations, and a destination summarization selected by a user, as well as the attributes of each summarization. The data may then be processed via a machine learning algorithm (such as a neural network) to determine what comparisons of attributes between the source and potential destination summarizations correlate to selection of an individual destination summarization. These comparisons of attributes may then be used as the comparisons of block 1506. Machine learning algorithms (including neural networks) are known in the art and thus not described in detail herein.

At block 1508, the computing device generates an overall affinity between the source summarizations and each potential destination summarization, according to the comparisons of block 1506. In one embodiment, the overall affinity is calculated as a weighted linear combination of a value of each comparison. The weights of each comparison may be pre-established, such as by an administrator of the computing system. Illustratively, the bulleted list of comparisons described above may also represent a weight of the comparisons, in decreasing order (e.g., such that a similarity of grouping criteria of a source summarization and token inputs to a second summarization is weighted more highly than a similarity of output data elements of the source summarization with a token input of the second summarization, etc.).

In another embodiment, weights of each comparison may be determined based on application of a machine learning algorithm on collected data (such as data reflective of source summarizations, potential destination summarizations, and a destination summarization selected by a user, as well as the attributes of each summarization). For example, a linear regression algorithm (which is well known in the art) may be applied to this data to identify the weights of comparisons in determining an overall affinity. As another example, outputs of a neural network algorithm (e.g., as used to determine specific comparisons) may further indicate weights to be given to those comparisons in determining an overall affinity.

At block 1510, the potential destination summarizations and associated affinities are returned by the computing device. Illustratively, the potential destination summarizations and associated affinities may be used to present an ordered list of potential destination summarizations, sorted by the determined affinities. The routine 1500 can thereafter end.

Figure 16:
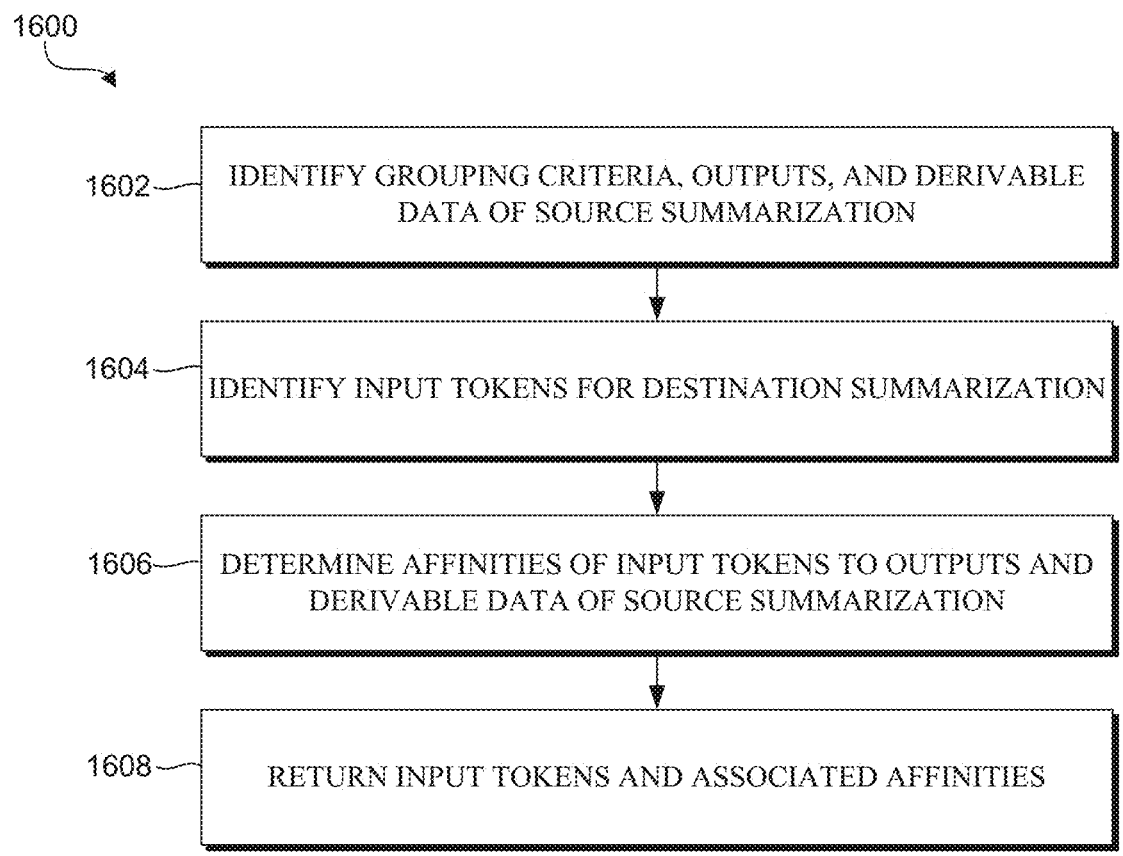
FIG. 16 is a flow diagram that illustrates how affinities of tokens of a second summarization to data elements of a first summarization may be determined based on data corresponding to the summarizations.

With reference to FIG. 16, one illustrative routine 1600 will be described for determination of affinities of tokens of a destination summarization with data elements associated with a source summarization. The routine 1600 may be implemented, for example, as a subroutine of the routine 1400 of FIG. 14 (e.g., as an implementation of block 1412 of FIG. 14).

The routine 1600 begins at block 1600, where data elements used as grouping criteria by a source summarization, output by a source summarization, or derivable from those output data elements, are determined. As discussed above, grouping criteria can include criteria by which data elements output by a source summarization are grouped or partitioned. Output data elements can include any data elements output for display in conjunction with a source summarization. Derivable data elements can include data elements derivable from those output data elements, such as child data elements (including grandchild elements, great grandchild elements, etc.), return values for child functions of the data elements functions, parent data elements (including grandparent elements, etc.), or other data elements obtainable based on an output data element. In one embodiment, derivable data elements may include all derivable data elements, or all data elements derivable based on a specific relationship (e.g., all child data elements, grandchild data elements, etc.). In another embodiment, derivable data elements may include data elements a threshold number of hierarchical connections away from an output data element.

At block 1604, the computing device determines input tokens for a destination summarization, which may be identified based on a configuration of the destination summarization. As discussed above, input tokens may correspond to parameters used to determine the data elements output by a destination summarization (e.g., parameters for a query corresponding to the destination summarization).

At block 1606, the computing device determines affinities between input tokens of the destination summarization and data elements output by the source summarization (or derivable from those outputs). In one embodiment, affinities can be determines for each input token, and can indicate a number, if any, of the outputs or derivable data elements of the source summarization that represent valid values for the input token. Illustratively, the affinity for each input token may be highest where a data type of the input token matches a grouping criteria of the source summarization, lower where a data type of the input token matches an output of the source summarization, and progressively lower where a data type of the input token matches elements derivable from outputs of the source summarization (e.g., where the progressively lower value is inversely proportional to a hierarchical distance between the element derivable from an output of the source summarization and the actual output of the source summarization). Thus, the affinity of a token can indicate a likelihood that selection of a data element within the source summarization would be expected to establish a value of the token in the second summarization.

Thereafter, at block 1608, the input tokens and associated affinities are returned by the computing device. Illustratively, the input tokens and associated affinities may be used to present an ordered list of potential input tokens, sorted by the determined affinities. The routine 1600 can thereafter end.

Figure 17:
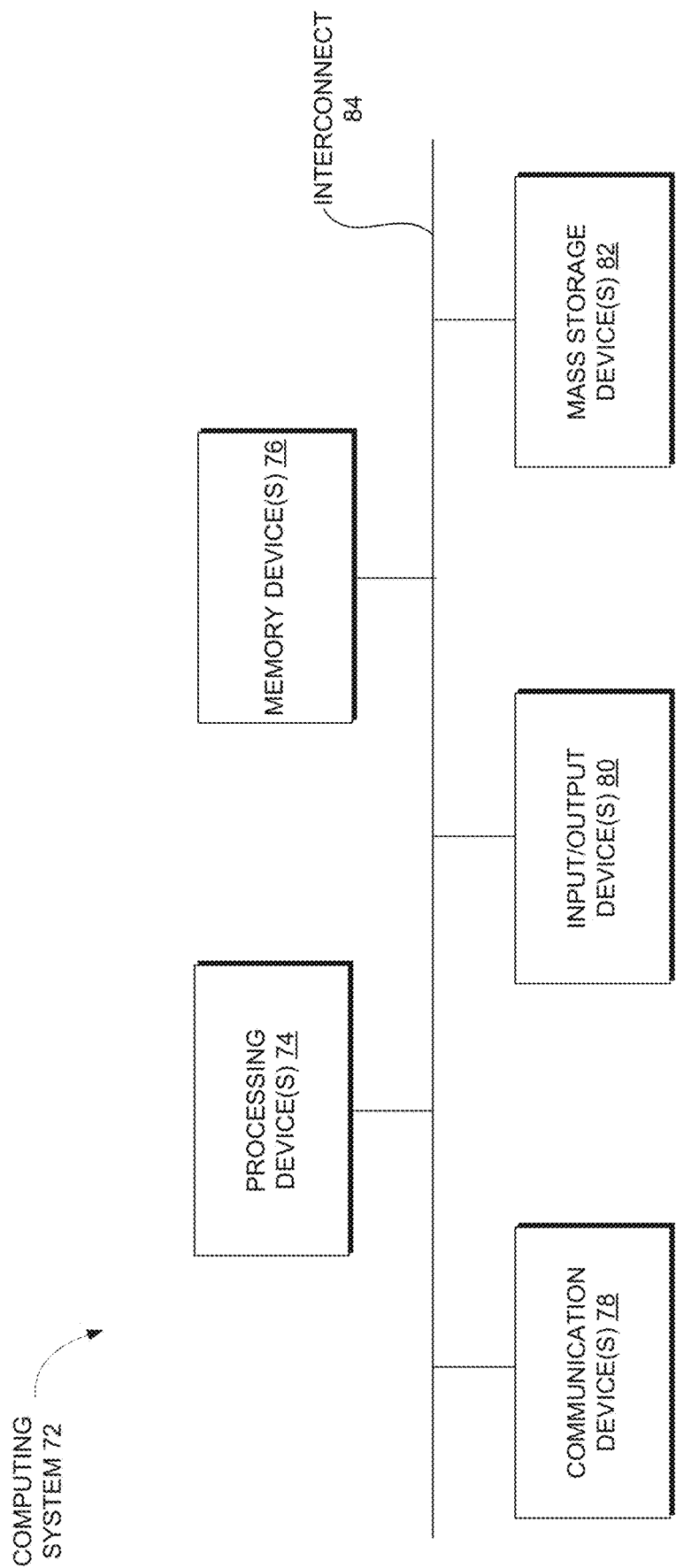
FIG. 17 is a block diagram illustrating a high-level example of a hardware architecture of a computing system in which one or more implementations may be embodied.

FIG. 17 is a block diagram illustrating a high-level example of a hardware architecture of a computing system in which an embodiment may be implemented. For example, the hardware architecture of a computing system 72 can be used to implement any one or more of the functional components described herein (e.g., indexer, data intake and query system, search head, data store, server computer system, edge device, etc.). In some embodiments, one or multiple instances of the computing system 72 can be used to implement the techniques described herein, where multiple such instances can be coupled to each other via one or more networks.

The illustrated computing system 72 includes one or more processing devices 74, one or more memory devices 76, one or more communication devices 78, one or more input/output (I/O) devices 80, and one or more mass storage devices 82, all coupled to each other through an interconnect 84. The interconnect 84 may be or include one or more conductive traces, buses, point-to-point connections, controllers, adapters, and/or other conventional connection devices. Each of the processing devices 74 controls, at least in part, the overall operation of the processing of the computing system 72 and can be or include, for example, one or more general-purpose programmable microprocessors, digital signal processors (DSPs), mobile application processors, microcontrollers, application-specific integrated circuits (ASICs), programmable gate arrays (PGAs), or the like, or a combination of such devices.

Each of the memory devices 76 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 82 can be or include one or more hard drives, digital versatile disks (DVDs), flash memories, or the like. Each memory device 76 and/or mass storage device 82 can store (individually or collectively) data and instructions that configure the processing device(s) 74 to execute operations to implement the techniques described above.

Each communication device 78 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing devices 74, each I/O device 80 can be or include a device such as a display (which may be a touch screen display), audio speaker, keyboard, mouse or other pointing device, microphone, camera, etc. Note, however, that such I/O devices 80 may be unnecessary if the processing device 74 is embodied solely as a server computer.

In the case of a client device (e.g., edge device), the communication devices(s) 78 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 78 can be or include, for example, any of the aforementioned types of communication devices, a wired Ethernet adapter, cable modem, DSL modem, or the like, or a combination of such devices.

A software program or algorithm, when referred to as "implemented in a computer-readable storage medium," includes computer-readable instructions stored in a memory device (e.g., memory device(s) 76). A processor (e.g., processing device(s) 74) is "configured to execute a software program" when at least one value associated with the software program is stored in a register that is readable by the processor. In some embodiments, routines executed to implement the disclosed techniques may be implemented as part of OS software (e.g., MICROSOFT WINDOWS® and LINUX®) or a specific software application, algorithm component, program, object, module, or sequence of instructions referred to as "computer programs."

Computer programs typically comprise one or more instructions set at various times in various memory devices of a computing device, which, when read and executed by at least one processor (e.g., processing device(s) 74), will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium (e.g., the memory device(s) 76).

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

The invention claimed is:

1. A computer-implemented method comprising:
receiving, for a first summarization of a data set, a request to identify a second summarization of the data set, wherein a summarization of the data set is a visualization summarizing search results of a query against the data set, and wherein the first summarization is associated with a first query;
determining affinities between the first summarization and each summarization of a plurality of summarizations of the data set, wherein each summarization of the plurality of summarizations is associated with a respective query against the data set that is distinct from the first query used to generate the first summarization, and wherein determining an affinity between the first summarization and a particular summarization of the plurality of summarizations includes comparing data elements of the first summarization and one or more inputs to a particular query associated with the particular summarization;
selecting, based on the affinities, the second summarization from the plurality of summarizations; and
transmitting an indication of the second summarization.

2. The computer-implemented method of claim 1, wherein comparing data elements of the first summarization and one or more inputs to the particular query associated with the particular summarization comprises determining that a data type for a grouping criteria of the data elements of the first summarization matches a data type of an input of the one or more inputs.

3. The computer-implemented method of claim 1, wherein comparing data elements of the first summarization and one or more inputs to the particular query associated with the particular summarization comprises determining that a data type of a data element, of the data elements of the first summarization, matches a data type of an input of the one or more inputs.

4. The computer-implemented method of claim 1, wherein comparing data elements of the first summarization and one or more inputs to the particular query associated with the particular summarization comprises determining that a data type of a data element derivable from the data elements of the first summarization matches a data type of an input of the one or more inputs.

5. The computer-implemented method of claim 1, wherein comparing data elements of the first summarization and one or more inputs to the particular query associated with the particular summarization comprises determining that a data type of a derivable data element matches a data type of an input of the one or more inputs, the derivable data element being derivable from the data elements of the first summarization, wherein derivability of one data element from another data element is established according to a data model that arranges objects hierarchically, and wherein the affinity between the first summarization and the particular summarization is based at least in part on a distance, within the data model, between the derivable data element and a data element of the first summarization from which the derivable data element is derived.

6. The computer-implemented method of claim 1, wherein determining an affinity between the first summarization and the particular summarization of the plurality of summarizations further includes a comparison of query attributes of the first query and query attributes of the respective query for the particular summarization.

7. The computer-implemented method of claim 1, wherein determining an affinity between the first summarization and the particular summarization of the plurality of summarizations further includes a comparison of a name of the particular summarization and one or more identifiers of one or more of the data elements of the first summarization, a grouping criteria for the data elements of the first summarization, or a data element derivable from the data elements of the first summarization.

8. The computer-implemented method of claim 1, wherein determining an affinity between the first summarization and the particular summarization of the plurality of summarizations further includes a comparison of a name of the particular summarization a name of the first summarization.

9. The computer-implemented method of claim 1, wherein determining the affinity between the first summarization and the particular summarization comprises setting the affinity between the first summarization and the particular summarization based at least partly based on a determination of whether a data element of the first summarization matches an input, of the one or more inputs of the particular query, that is settable via an input form associated with the particular summarization, and wherein setting the affinity between the first summarization and the particular summarization comprises setting a non-binary value at a first value when the data element of the first summarization matches the input that is settable via the input form, the first value being higher than a second value set when the data element of the first summarization does not match the input that is settable via the input form.

10. The computer-implemented method of claim 1, wherein determining the affinity between the first summarization and the particular summarization further includes a comparison of an event type associated with the first query and one or more event types associated with the respective query of the particular summarization.

11. The computer-implemented method of claim 1, wherein determining the affinity between the first summarization and the particular summarization further includes a comparison of a time range associated with the first query and a time range associated with the respective query of the particular summarization.

12. The computer-implemented method of claim 1, wherein determining the affinity between the first summarization and the particular summarization further includes a comparison of at least one of a time of creation of the first summarization and a time of creation of the particular summarization, a time of modification of first summarization and a time of modification of the particular summarization, or a time of most recent access of the first summarization and a time of most recent access of the particular summarization.

13. The computer-implemented method of claim 1 wherein selecting the second summarization based on the affinities comprises selecting the second summarization as having a highest affinity among the affinities.

14. The computer-implemented method of claim 1, further comprising:
selecting, based on the affinities, one or more additional summarizations from the plurality of summarizations; and
transmitting an indication of the one or more additional summarizations.

15. The computer-implemented method of claim 1, further comprising:
selecting, based on the affinities, one or more additional summarizations from the plurality of summarizations; and
transmitting an indication of the one or more additional summarizations;
wherein transmitting the indication of the second summarization and transmitting the indication of the one or more additional summarizations comprises transmitting an ordered list indicating the second summarization and the one or more additional summarizations, the ordered list being ordered according to affinities between the first summarization and each summarization indicated in the ordered list.

16. The computer-implemented method of claim 1, further comprising:
selecting, based on the affinities, one or more additional summarizations from the plurality of summarizations; and
transmitting an indication of the one or more additional summarizations;
wherein the one or more additional summarizations are selected as having higher affinity values among the affinities relative to unselected summarizations from the plurality of summarizations.

17. The computer-implemented method of claim 1 further comprising:
receiving a selection of the second summarization; and
configuring the first summarization to associate it with the second summarization, such that selection of a data element from the data elements of the first summarization causes generation of the second summarization.

18. The computer-implemented method of claim 1 further comprising:
receiving a request to suggest an input to the second summarization; and
determining the input to suggest based on a comparison of the data elements of the first summarization with one or more inputs of the second summarization.

19. A system comprising:
a data store storing computer-executable instructions; and
a processor configured to execute the computer-executable instructions, wherein the computer-executable instructions, when executed, cause the system to:
receive, for a first summarization of a data set, a request to identify a second summarization of the data set, wherein a summarization of the data set is a visualization summarizing search results of a query against the data set, and wherein the first summarization is associated with a first query;
determine affinities between the first summarization and each summarization of a plurality of summarizations of the data set, wherein each summarization of the plurality of summarizations is associated with a respective query against the data set that is distinct from the first query used to generate the first summarization, and wherein determining an affinity between the first summarization and a particular summarization of the plurality of summarizations includes comparing data elements of the first summarization and one or more inputs to a particular query associated with the particular summarization;
select, based on the affinities, the second summarization from the plurality of summarizations; and
transmit an indication of the second summarization.

20. One or more non-transitory computer-readable media comprising computer-executable instructions that, when executed by a computing system, cause the computing system to:
receive, for a first summarization of a data set, a request to identify a second summarization of the data set, wherein a summarization of the data set is a visualization summarizing search results of a query against the data set, and wherein the first summarization is associated with a first query;
determine affinities between the first summarization and each summarization of a plurality of summarizations of the data set, wherein each summarization of the plurality of summarizations is associated with a respective query against the data set that is distinct from the first query used to generate the first summarization, and wherein determining an affinity between the first summarization and a particular summarization of the plurality of summarizations includes comparing data elements of the first summarization and one or more inputs to a particular query associated with the particular summarization;

select, based on the affinities, the second summarization from the plurality of summarizations; and transmit an indication of the second summarization.

* * * * *